United States Patent
Suzuki et al.

(10) Patent No.: US 10,036,850 B2
(45) Date of Patent: Jul. 31, 2018

(54) POLARIZING AND POLARIZATION MAINTAINING LEAKAGE CHANNEL FIBERS

(71) Applicant: IMRA America, Inc., Ann Arbor, MI (US)

(72) Inventors: Shigeru Suzuki, Ann Arbor, MI (US); Hugh A. McKay, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 15/146,693

(22) Filed: May 4, 2016

(65) Prior Publication Data

US 2016/0245989 A1     Aug. 25, 2016

Related U.S. Application Data

(63) Continuation of application No. PCT/US2014/064066, filed on Nov. 5, 2014.
(Continued)

(51) Int. Cl.
*G02B 6/024* (2006.01)
*G02B 6/02* (2006.01)
*G02B 6/036* (2006.01)

(52) U.S. Cl.
CPC ......... *G02B 6/024* (2013.01); *G02B 6/02009* (2013.01); *G02B 6/02042* (2013.01);
(Continued)

(58) Field of Classification Search
CPC ................ G02B 6/024; G02B 6/02042; G02B 6/02314; G02B 6/02319; G02B 6/02357;
(Continued)

(56) References Cited

U.S. PATENT DOCUMENTS 6,954,575 B2   10/2005   Fermann et al.
7,289,709 B2   10/2007   Folkenberg et al.
(Continued)

FOREIGN PATENT DOCUMENTS

JP      2008-078629        4/2008
WO   WO 2010/065788 A1   6/2010
(Continued)

OTHER PUBLICATIONS

L. Dong et al: Ytterbium-doped all glass leakage channel fibers with highly fluorine-doped silica pump cladding*, Optics Express, vol. 17, No. 11, May 25, 2009, pp. 8962-8969.
(Continued)

*Primary Examiner* — John M Bedtelyon
(74) *Attorney, Agent, or Firm* — Knobbe, Martens, Olson & Bear, LLP

(57) ABSTRACT

This disclosure relates to polarizing optical fibers and polarization maintaining optical fibers, including active and/or passive implementations. An embodiment includes a polarizing (PZ) optical fiber that includes stress applying parts (SAPs) disposed in a first cladding region, the SAPs comprising a material with a thermal expansion coefficient, $\alpha_{SAP}$. A core region is at least partially surrounded by cladding features and the SAPs. The core includes glass with a thermal expansion coefficient, $\alpha_{core}$. The arrangement of the SAPs satisfies: $R_{sc}=d_{SAP}/D_{sc}$, where $D_{sc}$ is the SAP center to core center distance, and $d_{SAP}$ is the average SAP diameter, and $d\alpha=|\alpha_{SAP}-\alpha_{core}|$, and where Rsc and dα may be sufficiently large to induce stress birefringence into the core and to provide for polarized output. Active fibers in which a portion of the fiber is doped may be implemented for application in fiber lasers, fiber amplifiers, and/or optical pulse compressors.

31 Claims, 19 Drawing Sheets

Related U.S. Application Data

(60) Provisional application No. 61/907,754, filed on Nov. 22, 2013.

(52) U.S. Cl.
CPC ..... *G02B 6/02314* (2013.01); *G02B 6/02319* (2013.01); *G02B 6/02342* (2013.01); *G02B 6/02357* (2013.01); *G02B 6/03694* (2013.01)

(58) Field of Classification Search
CPC ............ G02B 6/02342; G02B 6/02009; G02B 6/03694
See application file for complete search history.

(56) References Cited

U.S. PATENT DOCUMENTS

| | | |
|---|---|---|
| 7,450,813 B2 | 11/2008 | Dong et al. |
| 7,724,422 B2 | 5/2010 | Abramczyk et al. |
| 7,787,729 B2 | 8/2010 | Dong et al. |
| 8,159,742 B2 * | 4/2012 | Dong ................. G02B 6/02009 359/341.1 |
| 8,199,398 B2 | 6/2012 | Fermann et al. |
| 2009/0201575 A1 | 8/2009 | Fermann et al. |
| 2009/0207483 A1 | 8/2009 | Goto |

FOREIGN PATENT DOCUMENTS

| | | |
|---|---|---|
| WO | WO 2012/146866 A1 | 11/2012 |
| WO | WO 2015/077021 A1 | 5/2015 |

OTHER PUBLICATIONS

International Search Report and Written Opinion in corresponding International Patent Application No. PCT/US2014/064066, dated Apr. 2, 2015, in 18 pages.

International Preliminary Report on Patentability in corresponding International Patent Application No. PCT/US2014/064066, dated May 24, 2016, in 12 pages.

* cited by examiner

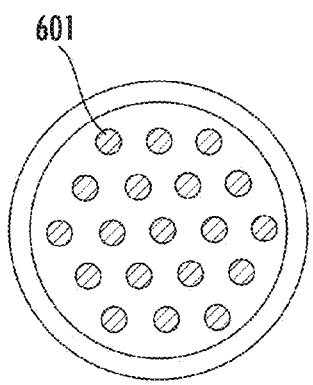
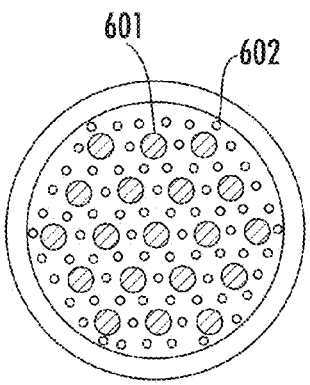
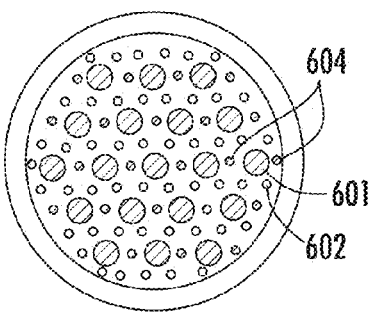
FIG. 6A  FIG. 6B  FIG. 6C
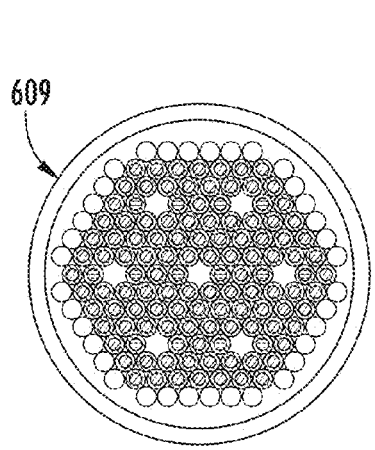
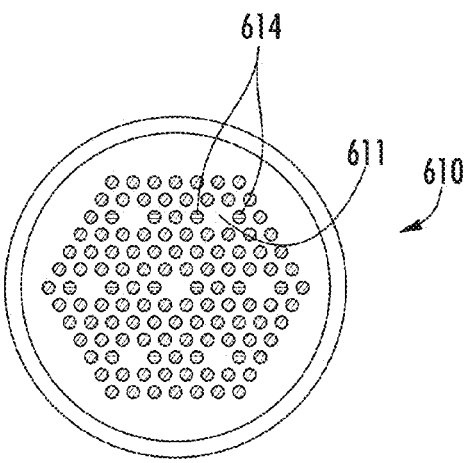
FIG. 6D  FIG. 6E

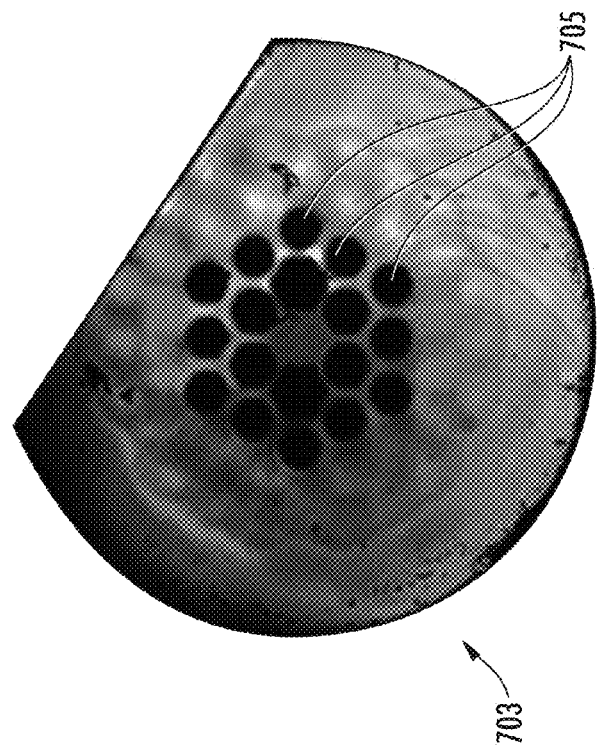
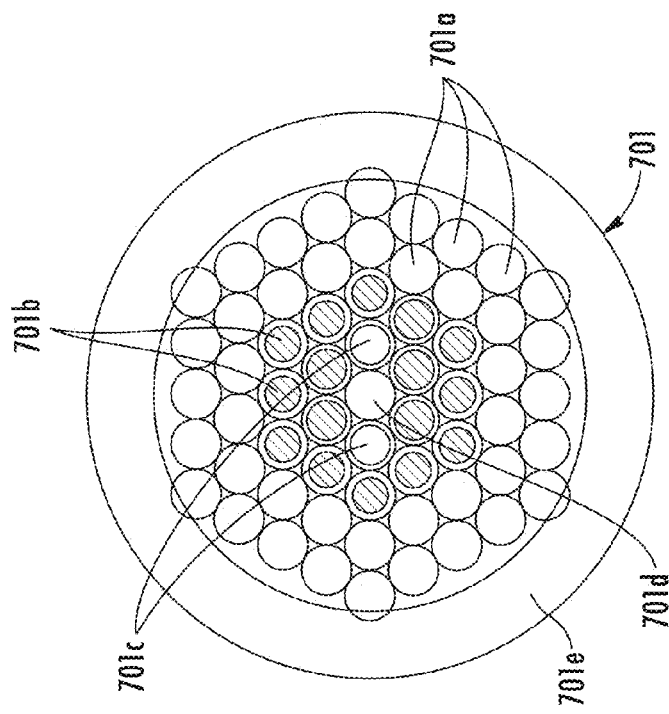
FIG. 7B
FIG. 7A

POLARIZING AND POLARIZATION MAINTAINING LEAKAGE CHANNEL FIBERS

CROSS-REFERENCE TO RELATED APPLICATIONS

This application is a continuation of international application no. PCT/US2014/064066, filed Nov. 5, 2014, entitled "POLARIZING AND POLARIZATION MAINTAINING LEAKAGE CHANNEL FIBERS," which claims the benefit of priority to U.S. Patent Application No. 61/907,754, filed Nov. 22, 2013, entitled "POLARIZING AND POLARIZATION MAINTAINING LEAKAGE CHANNEL FIBERS;" each of which is hereby incorporated by reference herein in its entirety.

BACKGROUND

Field

This disclosure relates to polarizing optical fibers and polarization maintaining optical fibers, including active and/or passive implementations of both types of such optical fibers.

Description of Related Art

The following patents and published patent applications describe one or both of polarizing (PZ) or polarization maintaining (PM) optical fiber arrangements: U.S. Pat. No. 6,954,575, "Single-polarization high power fiber lasers and amplifiers"; U.S. Pat. No. 7,724,422, "Method and Apparatus for providing light having a selected polarization within an optical fiber"; U.S. Pat. No. 7,289,709, "Photonic crystal fibres comprising stress elements"; U.S. Pat. No. 7,787,729, "Single mode propagation in fibers and rods having large leakage channels"; U.S. Pat. No. 8,159,742, "Glass large-core optical fibers"; U.S. Pat. No. 8,199,398, "High power parallel fiber arrays"; and U.S. Patent Application Pub. No. 2009/0207483, "Photonic bandgap fiber and fiber amplifier".

SUMMARY

This disclosure provides examples of polarizing optical fibers and polarization maintaining optical fibers, including active and/or passive implementations. At least one embodiment includes a polarizing (PZ) optical fiber. The fiber includes stress applying parts (SAPs) disposed in a first cladding region, the SAPs comprising a material with a thermal expansion coefficient, $\alpha_{SAP}$. A core region is at least partially surrounded by cladding features and the SAPs. The core includes a glass with a thermal expansion coefficient, $\alpha_{core}$. The arrangement of the SAPs satisfies the relations: $R_{sc}=d_{SAP}/D_{sc}$, where $D_{sc}$ is the SAP center to core center distance, and $d_{SAP}$ is the average SAP diameter, and $d\alpha=|\alpha_{SAP}-\alpha_{core}|$. In various embodiments, Rsc and dα are sufficiently large to induce stress birefringence into the core and to provide for a polarized output. Active fibers in which a portion of the fiber is doped (e.g., with a gain medium) may be implemented for application in fiber lasers, fiber amplifiers, and/or optical pulse compressors.

In a first aspect, an embodiment of a polarizing (PZ) optical fiber comprises a first cladding region comprising a first cladding material having a first index of refraction, n1; cladding features disposed in said first cladding region, said cladding features comprising a second cladding material having a second index of refraction, n2, wherein n2 is less than n1; stress applying parts (SAPs) disposed in said first cladding region, said SAPs comprising a material with a thermal expansion coefficient, $\alpha_{SAP}$; and a core region at least partially surrounded by said cladding features and said SAPs, said core region comprising a glass with a thermal expansion coefficient, $\alpha_{core}$; wherein arrangement of said SAPs satisfies the relations: $R_{sc}=d_{SAP}/D_{sc}$ where $D_{sc}$ is the distance of the SAP center to the center of the core center region, and $d_{SAP}$ is the average SAP diameter, and $d\alpha=|\alpha_{SAP}-\alpha_{core}|$, wherein $R_{sc}$ and dα are sufficiently large to induce stress birefringence into said core region and to provide for a polarized output from said fiber.

The PZ fiber according to aspect 1, wherein $R_{sc}$ is in the range from about 0.7 to about 0.95.

The PZ fiber according to aspect 1, wherein dα is greater than about $1\times10^{-7}$.

The PZ fiber according to aspect 1, wherein a refractive index of said core is in the range from about $(n_1+1\times10^{-4})$ to $(n_1-2\times10^{-4})$.

The PZ fiber according to aspect 1, wherein said core region propagates at least one lower order mode having a first polarization, while limiting propagation of a second polarization of said at least one lower order mode.

The PZ fiber according to aspect 1, said second cladding material comprising a second glass that comprises fluorine-doped silica glass or boron-doped silica glass.

The PZ fiber according to aspect 1, wherein at least a portion of said core region is doped with a dopant providing optical gain, and said PZ fiber comprises: cladding features disposed in an inner ring; multiple groups of SAPs partially surrounding said inner ring; and additional cladding features substantially disposed in a second ring partially surrounding said inner ring, wherein said second ring substantially includes SAPs from each of said groups, said PZ capable of producing an optical output pulse exhibiting PER in the range from about 15 dB to 25 dB and $M^2$ in the range from about 1.05 to about 1.08, in response to an optical input pulse.

The PZ fiber according to aspect 1, wherein $\Delta n=n1-n2$ is at least about $1.2\times10^{-3}$.

The PZ fiber according to aspect 1, wherein n2 is in the range from greater than 1 to about $(n1-5\times10^{-5})$.

The PZ fiber according to aspect 1, wherein n1 is in the range from greater than 1 to about 3.5.

The PZ fiber according to aspect 1, wherein said at least a portion of the fiber is doped with rare-earth ions.

The PZ fiber according to aspect 1, wherein at least a portion of said core region is doped with a dopant providing optical gain.

The PZ fiber according to aspect 1, wherein said cladding features are arranged in a plurality of rings, and said SAPs are arranged in a first innermost ring adjacent to said core region.

The PZ fiber according to aspect 1, wherein said SAPs and cladding features are arranged in at least one ring, each of said SAPs having a spacing $\Lambda_p$ between said SAP and a nearest cladding feature, wherein $d_{SAP}/\Lambda_p$ of at least one SAP is in the range from about 0.4 to about 0.75.

The PZ fiber according to aspect 1, wherein said polarized output from said fiber has an $M^2$ in the range from about 1.05 to about 1.7.

The PZ fiber according to aspect 1, wherein the first cladding material comprises a first glass that comprises fused silica The PZ fiber according to aspect 1, wherein said first cladding material comprises one or a combination of pyrex, soda-lime glass, phosphate glass, chalcogenide glass, fluoride glass, or a polymer.

The PZ fiber according to aspect 1, wherein said first cladding material comprises a single crystal material.

The PZ fiber according to aspect 1, wherein said core region has an average core diameter in the range from about 35 to about 150 µm and said first cladding region has an outer diameter at least about three times larger than the average core diameter.

In a 20th aspect, the PZ fiber according to aspect 1, wherein said PZ fiber comprises multiple cores, and multiple rings of low index cladding features surround at least a portion of at least one of said multiple cores.

The PZ fiber according to aspect 20, wherein said at least one of said multiple cores is doped with rare-earth ions and arranged as a portion of an active multicore leakage channel fiber array (MC-LCF) for generating high peak power optical pulses.

The PZ fiber according to aspect 1, wherein said PZ fiber is arranged as a pulse compressor in a high peak power amplification system, and is capable of compressing picosecond input pulses to a pulse width of less than about 100 fs.

The PZ fiber according to aspect 1, wherein, with said $R_{sc}$ and dα, the effective mode indices of the fundamental mode are altered in such a way that an effective index of a first polarization state is raised and the effective index of a second other polarization state is lowered.

In any of the foregoing aspects of PZ fiber, the PZ fiber can have a modal birefringence greater than about $8 \times 10^{-5}$.

In a 24th aspect, a polarization maintaining (PM) optical fiber comprises a first cladding region comprising a first cladding material having a first index of refraction, n1; cladding features disposed in said first cladding region, said cladding features comprising a second cladding material having a second index of refraction, n2, wherein n2 is less than n1; stress applying parts (SAPs) disposed in said first cladding region, said SAPs comprising an material with a thermal expansion coefficient, $α_{SAP}$; a core region at least partially surrounded by said cladding features and said SAPs, said core region comprising a glass with a thermal expansion coefficient, $α_{core}$; wherein said cladding features are disposed in a plurality of rings and said SAPs are disposed beyond an inner ring and distal to said core, wherein arrangement of said SAPs satisfies the relations: $R_{sc}=d_{SAP}/D_{sc}$, where $D_{sc}$ is the SAP center to core center distance, and $d_{SAP}$ is the average SAP diameter, and $dα=|α_{SAP}-α_{core}|$, wherein $R_{sc}$ and dα are sufficiently large to induce stress birefringence into said core and to maintain polarization of a polarized input beam received at an input to said PM fiber.

The PM fiber according to aspect 24, wherein $R_{sc}$ is in the range from about 0.4 to about 0.7

The PM fiber according to aspect 24, wherein said PM fiber comprises multiple core regions.

The PM fiber according to aspect 24, wherein, with said $R_{sc}$ and dα, the effective mode indices of the fundamental mode are altered in such a way that an effective index of a first polarization state is raised and the effective index of a second polarization state is lowered.

The PM fiber according to aspect 24, wherein dα is greater than about $1 \times 10^{-7}$.

In any of the foregoing aspects of PM fiber, the PM fiber can have a modal birefringence less than about $7 \times 10^{-5}$.

In any of the foregoing aspects of PM fiber or PZ fiber, the uniformity of the cladding material surrounding the core can be better than about $5 \times 10^{-5}$, about $1 \times 10^{-5}$, or better than about $5 \times 10^{-6}$.

The foregoing and other aspects will be described with reference to the figures and the following detailed description.

BRIEF DESCRIPTION OF THE DRAWINGS

FIGS. 6A, 6B, and 6C schematically illustrate cross-section views of examples of multicore fibers, including multicore PM and PZ LCFs.

FIGS. 6D and 6E schematically illustrate cross-section views of an example of a preform (FIG. 6D) and a multicore fiber (FIG. 6E) drawn from the preform.

FIGS. 7A and 7B illustrate an example preform stack for a polarizing LCF (FIG. 7A) and a corresponding example of a portion of a fabricated LCF (FIG. 7B).

Additional figures schematically illustrating additional embodiments of the disclosure are included in the various patents, patent publications, and patent applications incorporated by reference herein. The figures depict various embodiments of the present disclosure for purposes of illustration and are not intended to be limiting. Alternative embodiments of the systems and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

DETAILED DESCRIPTION

Leakage channel fiber (LCF) technology can provide for various examples of fibers with large core diameters, for example, greater than 40 um as described in U.S. Pat. Nos. 7,787,729 ('729) and 8,159,742 ('742). The '729 and '742 patents are hereby incorporated by reference herein in their entirety for all they disclose.

As discussed in '742 a leakage channel fiber may include: a first cladding region having a first cladding material with a first index of refraction, n1. Cladding features are disposed in the first cladding region. The cladding features include a second cladding material having a second index of refraction, n2, wherein n2 is less than n1, and a relative refractive index difference, $\Delta_c$, characterized by $(n1-n2)/n1$ that can be less than about $4.5 \times 10^{-3}$ in certain embodiments. A core region is at least partially surrounded by the cladding features. The first cladding region and the cladding features are configured such that said core region propagates at least one lower order mode having a wavelength, while limiting propagation of at least one higher order mode having the wavelength. At least one higher order mode has a higher loss than at least one lower order mode at the wavelength.

Figure 1A:
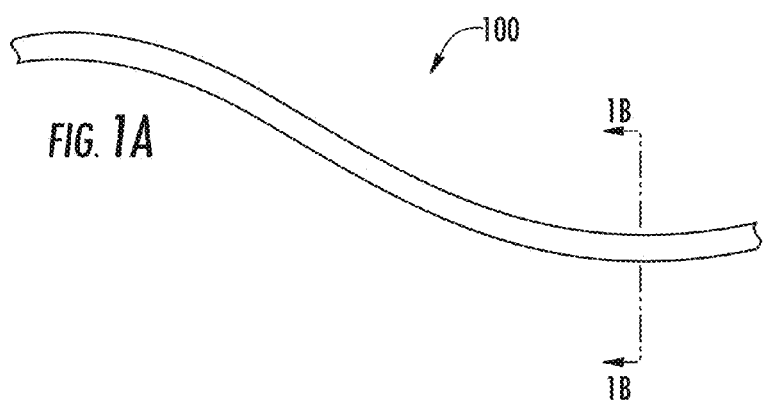
FIGS. 1A and 1B are respective side and cross-sectional views schematically illustrating an example of a leakage channel optical fiber and parameters pitch Λ, hole diameter d, core radius ρ, and fiber diameter $2ρ_0$. The example fiber also comprises a coating, and a cladding area beyond the holes. Leakage channel fibers may comprise large air holes for guiding an optical mode. In at least one embodiment of the present disclosure, a leakage channel fiber comprises commercially available fluorine-doped silica as a second cladding material (rather than air holes) in an all "all-glass" design, wherein a small relative refractive index $Δ_c$ is produced between the second cladding material and another cladding material. (The use of glass cladding features may result in larger cladding features in comparison to the case wherein the core diameter is the same but the cladding features comprise air holes.)
Figure 1B:
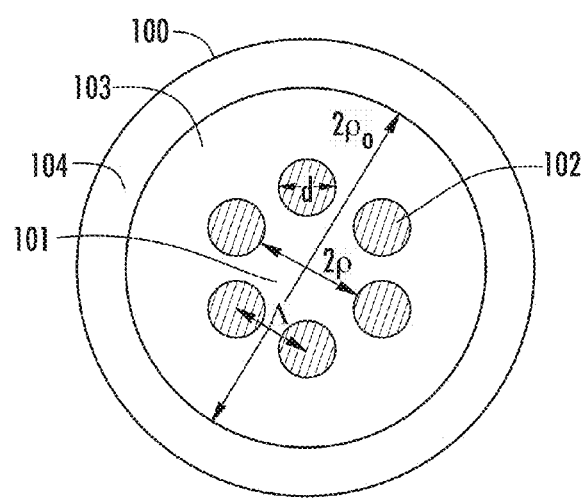

FIGS. 1A and 1B illustrate a leakage channel fiber. An example optical fiber 100 comprises a core 101 surrounded by cladding features 102, for example 6 holes. The features have a diameter of d and a center-to-center spacing, also referred to as pitch, Λ. The core has a diameter $2\rho$, defined as nearest hole-to-hole spacing $2\rho$. The fiber diameter is $2\rho_0$. In this example, a first cladding region 103 is formed beyond the low index cladding features 102, and a coating 104 is added. The normalized hole diameter d/Λ is chosen so that the leakage loss for the 2nd order mode is significantly higher than that of the fundamental mode. This provides for effective single mode operation at much larger core diameters than that is possible with conventional optical fiber by using this built-in mode filtering.

The fiber diameter is $2\rho_0$, can be measured across the first cladding region 103 but not including the optional coating 104. The core diameter $2\rho$, can be measured across the center of the fiber between inner boundaries of opposing cladding features 102.

Figure 1C:
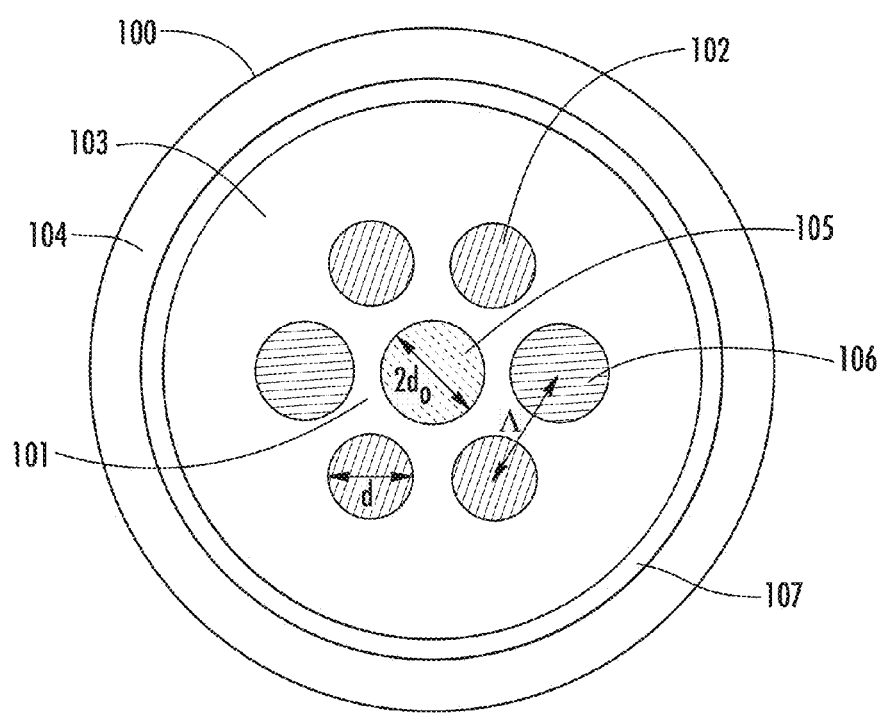
FIG. 1C is a cross sectional view schematically illustrating a double clad, polarization maintaining (PM) fiber, having a Ytterbium doped large core and a multi-material cladding corresponding to an embodiment of the present disclosure.

FIGS. 1B and 1C schematically illustrate circular holes as cladding features. Similarly, a fiber diameter $2\rho_0$ is shown for the exemplary circular fiber. As will become apparent from examples of fabricated fibers that follow, the cladding features may be non-circular and a shape of the fiber may comprise at least a non-circular portion. For example, some features or cladding shapes may approximate a hexagon, octagon, or may be rotationally asymmetric with linear and/or curved portions. In some embodiments a cladding shape may be irregular and without a clearly defined, standard shape.

In some embodiments, at least some of the cladding features can be holes that are at least partially evacuated or contain gas (e.g., air) or liquid. In some embodiments at least some of the cladding features can include features having a refractive index that is different from a refractive index of the material surrounding the feature, for example, a refractive index that is less than the refractive index of the material surrounding the feature.

One possible definition of a polygon diameter is the maximum distance between any pairs of vertices, and corresponds to the longest polygon diagonal. Further, with respect to a feature's dimension d, unless otherwise stated d/2 is generally regarded as the distance from the center of a feature to a side along a line linking the centers of two nearest neighbors. The center of a feature may be calculated as the "center of mass" or "centroid" for non-circular or asymmetric features.

By way of example, numerical values of the fiber diameter are generally referenced to the outer edge of the first cladding 103 as shown in FIG. 1-b, which may also be utilized as a pump guide in some embodiments. For a circular fiber example the diameter is $2\rho_0$. The diameter is the maximum dimension to outer edges of first cladding 103 along a line through the core 101 center.

In at least one embodiment, at least one of the cladding features 102 is fabricated from a second material glass having a lower refractive index than that of either the core 101 or other cladding materials(s) (e.g., first cladding material) 103. Some embodiments comprise "all-glass" designs wherein both the cladding features 102 and the material in which the cladding features are disposed comprise glass. At least some of the cladding features 102 can comprise glass.

A very small relative refractive difference, for example $\Lambda_c$ approximately $8.3 \times 10^{-4}$, is created between, for example, fluorine doped silica (the fluorine doped silica or other suitable material for the cladding features 102 being used rather than all air holes) and another cladding material in which the cladding features are disposed. Cladding materials 102 ($_{2nd}$ cladding) will generally have a slightly lower refractive index than that of the cladding materials 103 ($1^{st}$ cladding) of the optical fiber 101. Surprisingly, low loss single mode operations for both photonic crystal fibers and leakage channel fibers may occur with relative refractive index difference between the two cladding materials substantially lower than $7 \times 10^{-3}$. In some embodiments the relative refractive index difference $\Delta_c$ is as low as $2 \times 10^{-4}$ for large core fibers. The relative refractive index may be lower as well. In some embodiments $\Delta_c$ may be less than about $1 \times 10^{-3}$, or less than about $4.5 \times 10^{-3}$. In the fiber embodiments described herein, the relative refractive index is determined at a nominal wavelength of 1.05 μm. Numerical simulations were generally performed based on a design wavelength of 1.05 μm, however wavelength dependence was quantified and found to be weak.

Moreover, the all-glass photonic crystal fibers, endless single mode optical fibers and leakage channel fibers may provide for ease of use comparable to conventional optical fibers as well as ease of manufacturing. As described above, advantages of such "all glass" fiber include sufficiently low bending loss, improved repeatability of product produced and performance because of the lack of air holes, and the shape of the fiber cross-section which readily takes the form of a hexagon shaped, for example, with rounded corners.

Generally, a very small relative refractive index provides for sufficient mode filtering for single mode operation while also providing reasonable bend loss performance. Although larger $\Delta_c$ implies good mode filtering and bend performance, a sufficiently small relative index difference provides for single mode and control of bend loss. Also, as described above, a reduced or minimum useful refractive index difference between the first background cladding materials and that of the 2nd cladding material in the holes improve manufacturability and performance significantly. Results obtained by fabricating several leakage channel fibers with fluorine-doped silica with a relative refractive index difference $\Delta_c \approx 8.3 \times 10^{-4}$ to replace air holes used in the previous designs are discussed below. Embodiments having the fabricated leakage channel fibers were determined to provide sufficient bend loss performance for many applications.

As described above, bend loss performance was known to deteriorate with low relative index difference, and was confirmed with Applicant's experiments and simulations. However, Applicant discovered significant improvements in mode filtering with a low relative index difference, and also found that bend loss performance was adequate. This, e.g., "all glass", design, provides for improved mode filtering in comparison to equivalent leakage channel fibers where the cladding features comprises air holes.

In some embodiments with much smaller refractive difference between the two cladding materials, widely available high purity fused silica glass can be used as the 1st cladding glass 103 while another high purity silica glass doped with fluorine or/and boron can be used as the $2^{nd}$ cladding glass 102. If fluorine and boron doping levels are low, the two cladding materials will have good mechanical, chemical, physical and thermal compatibility. Commercially available fluorine-doped silica may be used as a material for holes 102 and high purity silica glass for the $1^{st}$ cladding 103. Other materials and designs are also possible.

FIG. 1C is another example of an "all-glass" design: a double clad, polarization maintaining, ytterbium-doped large core fiber. (As discussed above, when such double clad arrangement is included in a fiber having a non-circular, e.g., hexagonal cross-section, pump mixing can be increased.) Ytterbium-doped area 105 inside core 101 has a diameter of $2d_0$ and a refractive index closely matched to the surrounding glass.

As discussed above, FIG. 1C is a cross sectional view schematically illustrating an example of a double clad, polarization maintaining (PM) fiber, having a large core and a multi-material cladding. In some embodiments, at least a portion of the core can be doped with one or more dopants, for example with one or more rare earth ions such as Ytterbium. At least a portion of the core can be doped with one or more dopants, and the dopants can include rare-earth ions. The dopants can provide optical gain (such fibers are sometimes referred to as active fibers in contrast to passive fibers which do not provide optical gain).

Two stress applying elements 106 (SAPs) have substantially different thermal expansion coefficient from the surrounding glass and different refractive index from that of other low index features 102. The stress elements 106 may also have different dimension and size from other low index features 102. Stress elements 106 can be made from boron-doped silica glass. In this example, glass 107 is a low refractive index glass to provide pump cladding, and can be made from fluorine and/or boron doped silica glass.

Construction of the fiber of FIGS. 1A-1D may generally be carried out with standard methods of construction of leakage fiber designs. For example, a fluorine-doped silica rod is first inserted into silica tubes to be drawn into canes with desired diameters and ratio of fluorine-doped silica to silica glass. The canes along with silica canes are then stacked in a hexagonal stack in the desired configuration. The stack is then inserted into a silica tube to be drawn into fibers. Vacuum inside the silica tube is sometimes used in combination with low drawing temperatures to produce non-circular (e.g. hexagonal fibers) fibers. Ytterbium-doped silica rod or/and stress rods are sometimes used in the stack to make ytterbium-doped fiber or/and polarization maintaining fiber. Generally, low relative index, "all-glass" construction may simplify overall manufacturing of leakage fibers, for example, as described above.

Figure 1D:
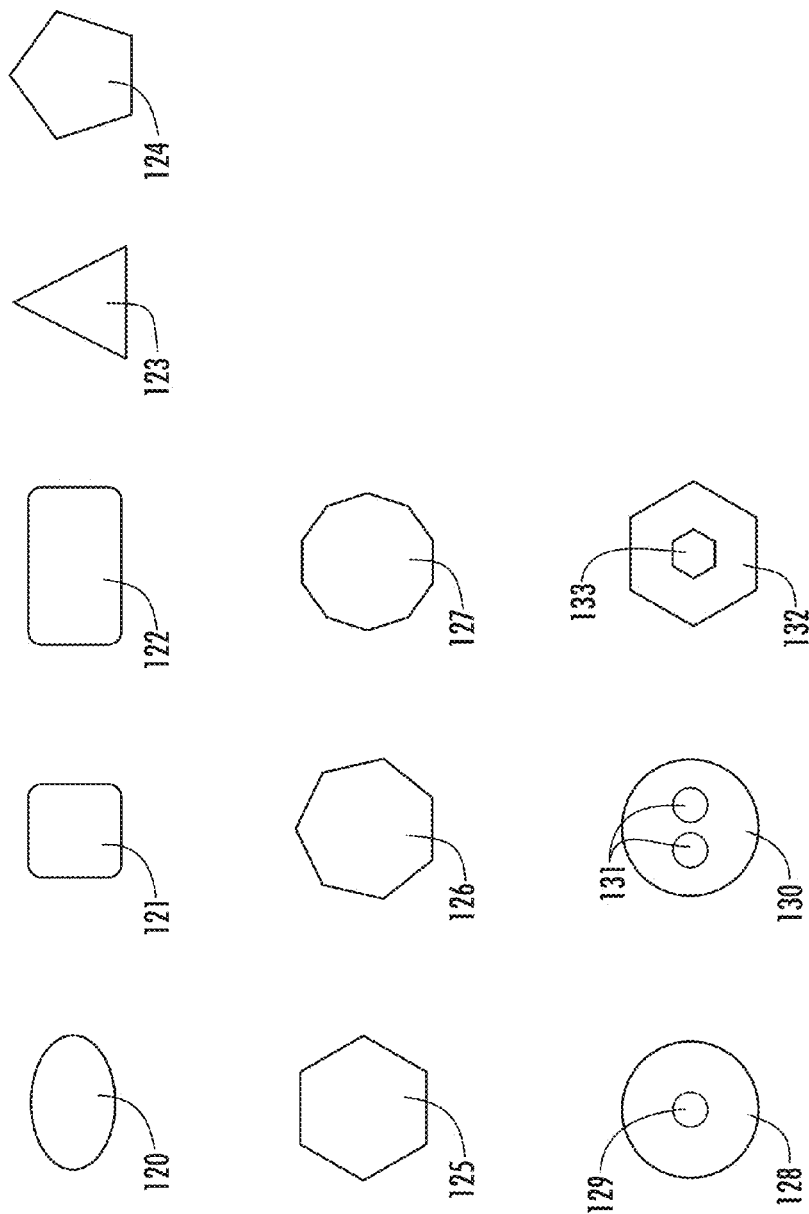
FIG. 1D illustrates other cladding feature shapes that may be employed. A variety of different cladding feature cross-sections are shown although the cladding feature design is not limited to these.

FIG. 1D illustrates other cladding feature shapes that may be employed. As shown, the cross-section of the cladding feature is not limited to circular shapes. FIG. 1D illustrates some other possible shapes 120-127, which can also be used. Accordingly, the configurations of the cladding feature, for example, the shape, dimension, material, refractive indexes, etc. of the cladding feature can vary. The variations are not limited to the perimeter of the cladding feature but can include further internal features and design as well. Cross-sections 128, 130 and 132 in FIG. 1-d, for example, show one or more inclusions with different refractive index 129, 131 and 133 than the material in which these inclusions are imbedded. These internal features can vary as well, for example, in shape, size, arrangement, material, refractive index, etc. Still other designs are possible.

In any fiber described herein, one or more of the cladding features can have shapes, dimensions, materials, and/or refractive indexes that are different from each other, e.g., not all of the cladding features need have the same design.

Figure 2A:
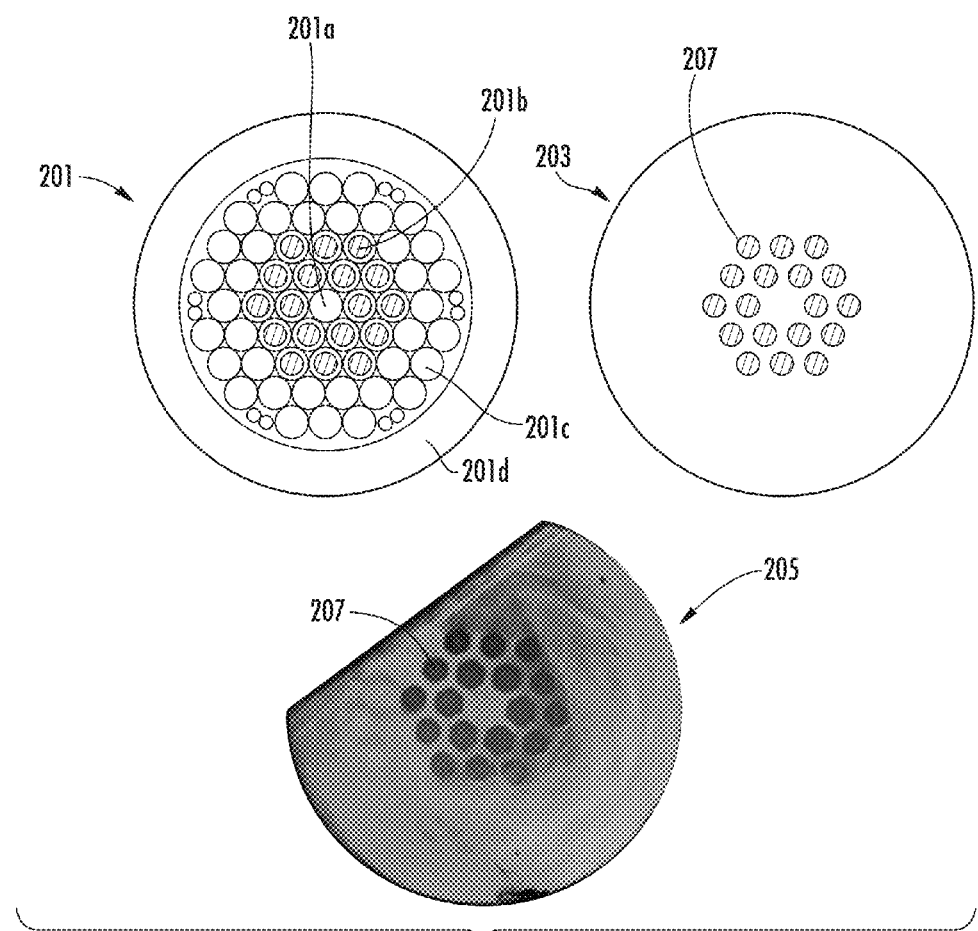
FIG. 2A schematically illustrates an example of a leakage channel fiber (LCF) (top right) together with a corresponding pre-form stack (top left) and image of an example of a portion of a fabricated fiber (bottom).

FIG. 2A schematically illustrates an example of a large core, leakage channel fiber 203 and corresponding preform 201. The LCF 203 can be drawn from the preform 201. A portion of a fabricated LCF 205 is also shown. As discussed above, an LCF may be characterized by having a core and an inner cladding forming a first cladding region. One or more additional outer cladding regions may be utilized, for example, to guide pump light from a pump source. In some embodiments, the core and inner cladding (e.g., the first cladding region 103) may comprise glass having a refractive index $n_1$. The inner cladding can include a background glass with refractive index $n_1$ and one or more cladding features with refractive indices smaller than $n_1$. The cladding features may be all-glass or a combination of low index glass, gas (e.g., air), vacuum, or other lower index medium The arrangement of low index cladding features provides leakage channels that provide higher loss for at least one higher-order mode relative to at least one lower-order mode (e.g., the fundamental mode).

Confinement loss for all modes in the LCF core may, in some cases, be much larger than in a standard step index fiber. One advantage of the LCF is the differential loss between the fundamental mode and the next higher order mode may be large. Loss for the fundamental mode may be 0.05 dB/m to 2 dB/m while loss for the next higher order mode may be in the range 5 dB/m to 20 dB/m. Over a length of the fiber, the FM is guided while HOMs leak out to the fiber cladding.

In various embodiments the background glass in an LCF is synthetic fused silica. The low index features 207 in FIG.

2A may include fluorine doped silica glass with a refractive index $1.2 \times 10^{-3}$ below that of fused silica. The low index features may be arranged in a few rings (e.g., 1, 2, 3, 4, or more rings), which may sometimes be referred to as layers, disposed about the core. In certain preferred implementations 2 or 3 rings may be utilized. By way of example, the LCF 205 shown in FIG. 2A is arranged with two rings. In some embodiments, no more than 3 rings of low index features are utilized.

The low index features have a periodicity Λ and a diameter d. The diameter d can represent the diameter of a circular feature or the maximum width of a non-circular feature. The ratio d/Λ is a parameter that may be used to characterize the leakage channel size. As will become apparent in the examples that follow the SAPs in an LCF may be characterized in part by having a pitch $\Lambda_p$ which is the distance from the center of a SAP to the nearest low index cladding feature. The ratio d/Λ for low index features arranged in a ring need not be uniform. The ratio $d/\Lambda_p$ for SAPs arranged in a ring need not be uniform. Likewise, the ratio need not be uniform for each ring, e.g., the ratios d/Λ and/or $d/\Lambda_p$ can be different for different rings.

Polarization maintaining (PM) passive or active fibers may be utilized in fiber lasers/amplifiers where polarized light output is required. Leakage channel fibers can be polarization maintaining as discussed in '742, for example as described with respect to at least FIG. 1C of '742.

Regarding polarization effects in optical fiber, first consider a standard single mode (SM) fiber. The core will only support a fundamental mode. However, the fundamental mode is degenerate for two orthogonal polarization states. Ideally, these two degenerate states have identical propagation constants all along the fiber. A polarized light pulse propagating in the fiber would remain in the initial polarization state in this ideal case. However, as a result of random stress due to fiber micro-bending and/or other environmental effects, a polarized light pulse travelling in the single mode fiber in one of these two degenerate states couples power into the other polarization state. The propagation constants are nearly equal between the two polarization states in SM fiber so coupling between the two states is facilitated. Thus, polarized light injected into a standard SM fiber will typically emerge un-polarized, partially polarized, elliptically polarized, or generally with a reduced polarization extinction ratio which is the power ratio in dB between the two output polarization axes.

To preserve polarization in PM designs utilizing single mode (SM) fiber, the fiber can be drawn with one or more stress applying parts (SAP)s, for example stress rods. Stress-optic effects induced with the SAPs change the effective mode indices of the fundamental mode, and hence the propagation constants. The effective index of one polarization state is raised creating a "slow axis". The effective index of the other polarization state is lowered creating a "fast axis". The ability of random stress effects to cause mode coupling is reduced as a result of the increased difference in effective mode indices.

Polarized light can be launched into an input of a PM fiber with its polarization axis parallel to the slow axis or parallel to the fast axis of the PM fiber. Both axes will guide light. Light arriving at the output of the PM fiber will have substantially the same polarization as at the input. A figure of merit for the system is the polarization extinction ratio (PER).

It is possible to fabricate polarizing fiber or to adjust parameters in normally PM fibers such that only one polarization state is guided. Polarized light launched into the non-preferred polarization state will be lost to the fiber cladding.

As an example of a prior polarizing fiber, U.S. Pat. No. 7,289,709, entitled "Photonic crystal fibres comprising stress elements", teaches single mode, single polarization guidance and amplification in a large mode area photonic crystal fiber (PCF). Examples of polarizing photonic crystal fibers (PCF) were disclosed in '709. For example, one of the fundamental polarization states is guided wherein the difference Δn between the effective refractive index $n_{mode}$ of the fundamental mode and the effective refractive index $n_{eff}$ of the cladding region is less than or substantially equal to the modal birefringence $B_{mode}$ of the core in region. For a center wavelength, λ, a single polarizing bandwidth Δλ results in which only one of the fundamental polarization states is guided. The index difference Δn may be adapted to be smaller than 50% of $B_{mode}$, smaller than 20% of $B_{mode}$, or smaller than 10% of $B_{mode}$.

It was pointed out in '709 that several parameters may affect the single polarizing bandwidth Δλ and/or its center wavelength $\lambda_c$. A group of parameters include, for example, the difference $\Delta\alpha_T$ between the coefficients of thermal expansion $\alpha_{T,SAP}$ and $\alpha_{T,cladback}$ of stress elements and the cladding background material, respectively; the minimum distance Λ between two neighboring micro-structural elements; the relative size of the micro-structural elements d/Λ; the difference between the core $n_{core}$ and cladding background $n_{cladback}$ refractive indices; the bending radius of the photonic crystal fiber; and combinations thereof. Such parameters may provide for tailoring of the polarizing bandwidth and its center wavelength to the particular application requirements. Control of the core and cladding background refractive indices allows the control of the mode field diameter thereby facilitating splicing to other microstructured or non-micro-structured optical fibers.

When compared to a PCF, a leakage channel fiber, with a preferred all-solid glass arrangement, may facilitate development of large mode fiber lasers and amplifiers. In at least one embodiment an LCF includes a large core surrounded with a few rings (e.g., 2 or 3) of relatively large air holes and provides a relatively high loss for higher order modes. As disclosed in '742, in certain preferred arrangements a glass LCF includes a large core surrounded with a few rings of low index cladding features, for example a low index glass. The low index regions define narrow channels in the cladding glass. In some arrangements an all-glass LCF may be provided. Comparative examples of non-PM, PM, and polarizing (PZ) LCFs are discussed below.

Referring again to FIG. 2A, an example of a leakage channel fiber (LCF) 203 is illustrated together with a corresponding preform stack 201 (from which the fiber 203 can be drawn), and image of an example of a fabricated fiber 205. In this example the fiber may be characterized as a 50/480 LCF, corresponding to a 50 μm core and 480 μm diameter first (inner) cladding. The preform 201 includes a central solid rod 201a surrounded by two layers of low-index rods 201b. The rods 201b are composed of a core and a cladding. The core of a rod 201b is formed from material having a refractive index lower than the refractive index of the rod 201a. The cladding of a rod 201b is formed from a material having a refractive index identical to the material of rod 201a. The all-glass LCF low index features 201b are arranged in two layers with d/Λ=0.8 for the inner ring and d/Λ=0.7 for the outer ring. The layers of low-index rods 201b are surrounded by two layers of solid rods 201c to form a cladding. The rods 201c comprise a material with the same refractive index as the core rod 201a. The rods 201a-201c are stacked inside an outer cladding tube 201d. The cladding tube 201d may have the same refractive index as the rods 201c. The microscope image illustrates the slightly different size of the cladding features of the inner and outer rings in the fabricated LCF 205. No SAPs are included and the fiber is non-PM in this example.

Figure 2B:
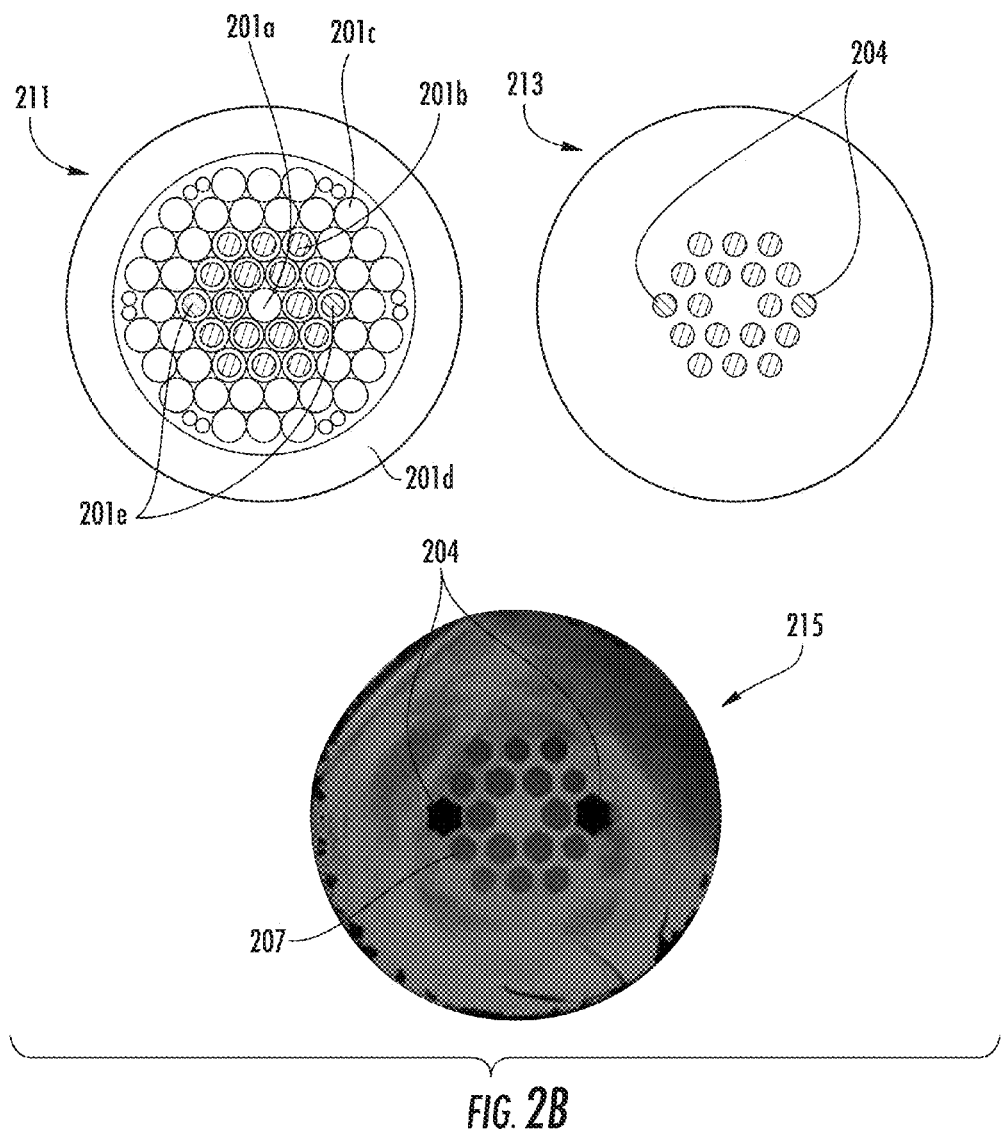
FIG. 2B schematically illustrates an example of a preform (top left) and fiber (top right) corresponding to a large core polarization maintaining (PM) LCF, and includes a microscope image of a corresponding example of a fabricated large core PM LCF (bottom).

FIG. 2B schematically illustrates examples of a preform 211 and fiber 213 corresponding to a large core polarization maintaining (PM) LCF, and includes a microscope image of an example corresponding fabricated large core PM LCF. The fiber is a 50/480 LCF having d/Λ with the same values as in FIG. 2A for the low index features. Two non-circular SAPs 204 in the outer ring are arranged with $d/\Lambda_p$~0.9 and provide for PM operation, where d is the maximum diameter of the SAP and $\Lambda_p$ is the spacing between the center of the SAP 204 and the center of closest adjacent cladding feature A microscope image of a fabricated PM fiber 215 is shown. In this example the SAPs are larger than the cladding features in the outer ring. The preform 211 is generally similar to the preform 201 but includes two SAP rods 201e in the outer ring of low-index rods 201c. The SAP rods 201e have coefficients of thermal expansion that are different from the coefficient of thermal expansion of the rods 201c that form the cladding and/or the rods 201b that form the low-index features.

Figure 3A:
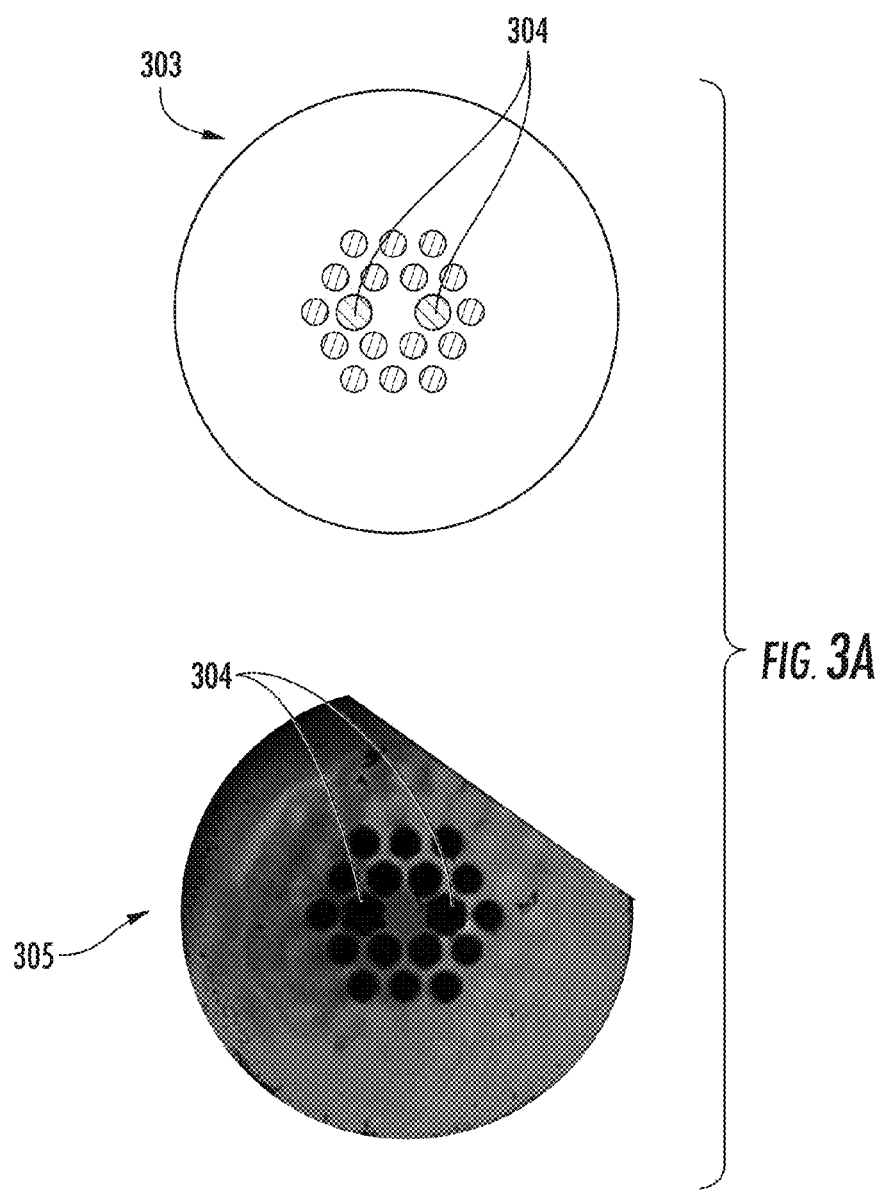
FIG. 3A schematically illustrates an example of a polarizing (PZ) LCF (top) and an image of an example of a portion of a fabricated PZ LCF (bottom).
Figure 3B:
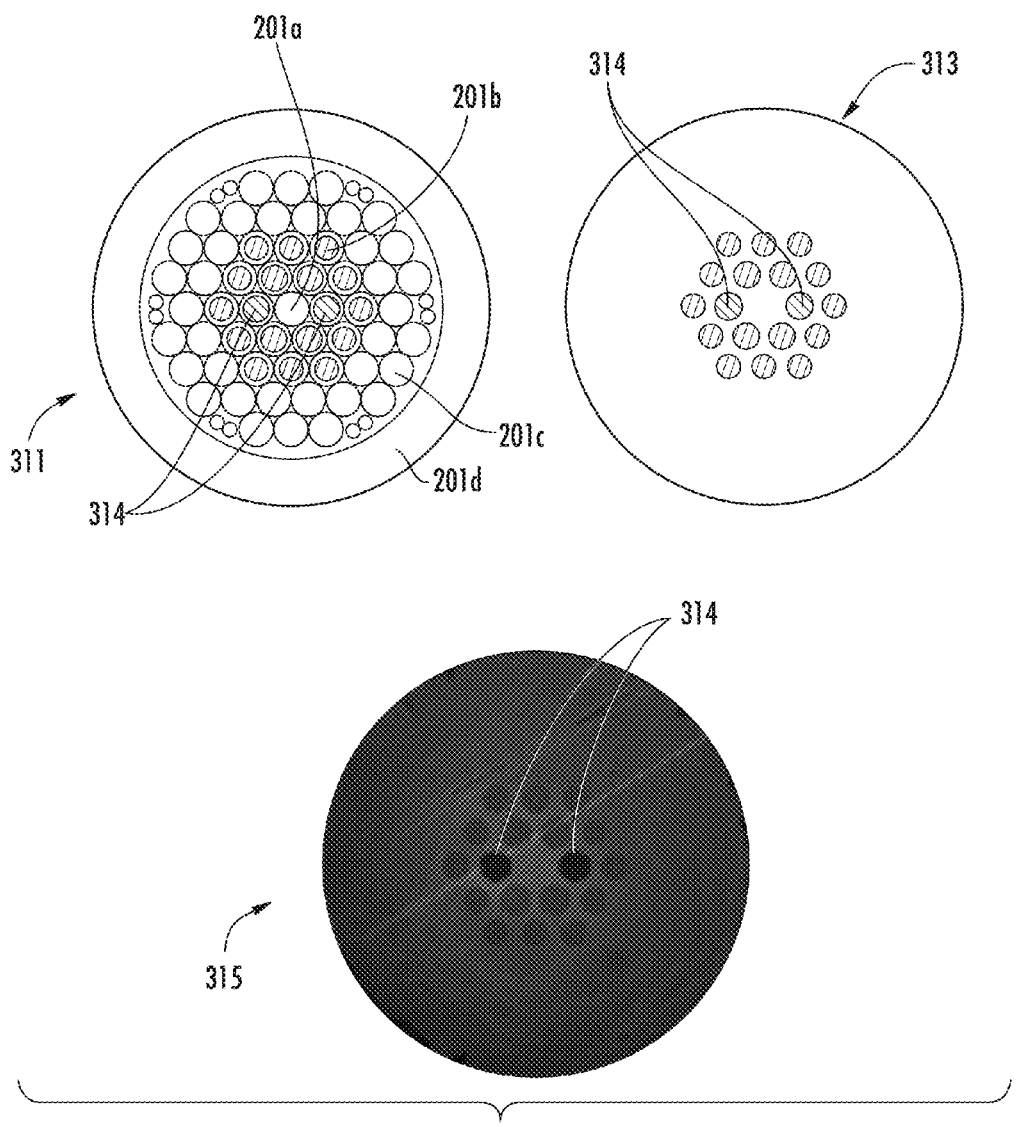
FIG. 3B schematically illustrates another example of a polarizing (PZ) LCF (top right) and preform (top left) together with an image of an example of a fabricated LCF (bottom).

FIGS. 3A-3B schematically illustrate examples of polarizing (PZ) LCFs 303, 313 together with respective examples of fabricated LCFs 305, 315. Each fiber is a 50/480 LCF having d/Λ with the same values as in FIG. 2A for low index features. In contrast to the PM example of FIG. 2B, two SAPs 304 are included in the inner ring of the LCF 303 and the fabricated PZ LCF 305 with $d/\Lambda_p$=0.9 (FIG. 3A) and SAPs 314 in the inner ring of the LCF 313 and the fabricated PZ LCF 315 with $d/\Lambda_p$=0.75 (FIG. 3B). Thus, different stresses are applied to the fiber by the SAPs, and each resulted in polarizing (PZ) capability. FIG. 3B also shows an example of a preform 311 from which the fiber 313 can be drawn. The preform 311 is generally similar to the preform 211 but includes two stress applying rods 314.

Figure 4:
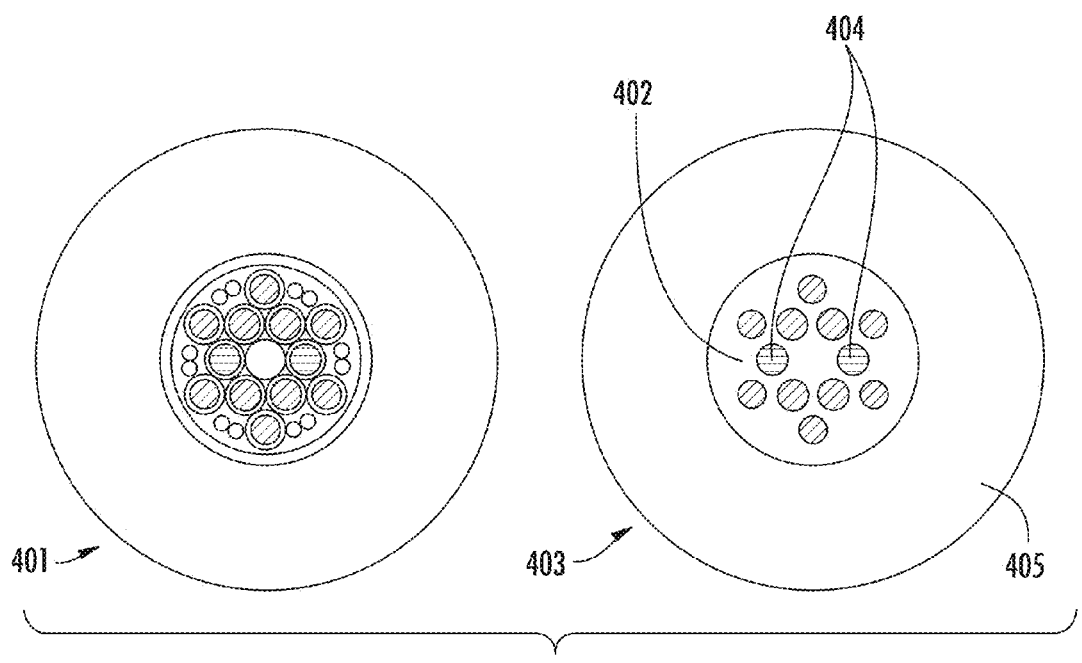
FIG. 4 schematically illustrates an example of a polarizing LCF pre-form stack (left) and an example of a fiber (right) with an outermost cladding configured as a pump guide.

FIG. 4 schematically illustrates an example of a polarizing LCF preform 401 and an example of an LCF fiber 403 with an outermost cladding 405 configured as a pump guide. The background glass 402 surrounding the core and low index feature region has a higher refractive index than the surrounding glass 405. The NA of the background glass 402 relative to the surrounding glass 405 may be in the range 0.1-0.3 to form the pump guide. In this example the fiber is a 50/480 LCF. Two SAPs 404 are included in the inner ring with $d/\Lambda_p$=0.75. Four low index features are disposed in the inner ring with d/Λ=0.8. In this example the outer ring is partially populated with low index features with d/Λ=0.7. The ratios of the feature dimension to spacing are in accordance with the "nearest neighbor" criteria listed above. A rare-earth doped core region (not separately shown) surrounded by the SAPs 404 and the inner layer of low index features may be formed to provide the 50/200 leakage channel gain fiber. Such a PZ LCF may be utilized in a fiber amplifier or fiber laser system.

Figure 5:
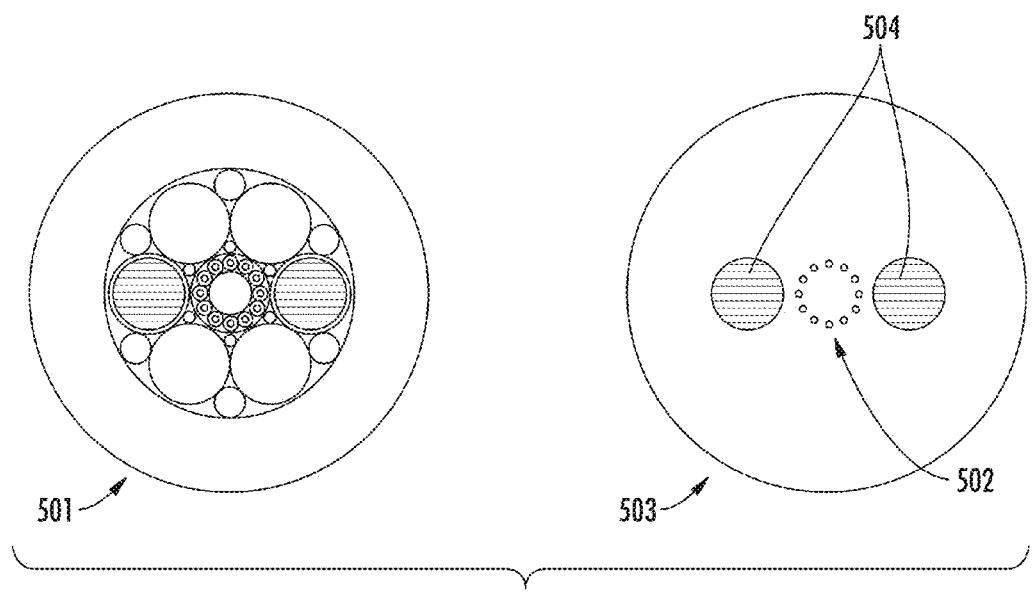
FIG. 5 schematically illustrates an example arrangement of a polarizing LCF preform (left) and fiber (right) in which the leakage channels, which arise from the low index cladding features, are arranged in a nearly circular configuration.

FIG. 5 schematically illustrates an example of an arrangement of polarizing LCF 503 in which a single ring 502 of twelve low index cladding features for leakage channels are arranged in a nearly circular configuration. In this example the low index features (and leakage channels) are not arranged in a hexagonal pattern but more closely approximates a circle (e.g., a 12-sided polygon). The diameter of each of the two SAPs 504 is larger than the core diameter, and much larger than the diameter of the low index cladding features, for example about 5-10 times larger in this example.

Without subscribing to any particular theory, several effects became apparent during development of various examples of fabricated fibers. With fabricated fibers, no significant effect on polarizing was observed as a function of the number of layers or spacing between the low-index features. If the number of layers is too small for example one layer or unpopulated layers the loss may increase but the polarizing capability is maintained. (an unpopulated layer is a layer in the preform stack without depressed index features that form leakage channels) Similarly, if the spacing between features decreases the extinction ratio is also decreased with increased crosstalk between modes. However, polarizing properties are retained. Also, because decreasing spacing allows for propagation of increasing number of modes in the core, the extinction ratio decreases.

It is believed, although not required, that the stress optic effect has considerable influence on polarizing capability. If stress on the core is reduced by fabricating fibers with SAPs with increased distance from the core, various examples of fabricated fiber exhibited increased PM operation rather than polarizing (PZ) operation. Moreover, it is not critical or essential that $d/\Lambda_p$ for the SAPs be larger than d/Λ for the low index features for the fiber to be polarizing. Such observations support polarizing effects being induced by the stress optic effect.

In at least one embodiment a polarizing leakage channel fiber may be constructed based on the following principles and actions.

Select a cladding glass with refractive index $n_1$ and thermal expansion coefficient (TEC) $\alpha_{clad}$. A cladding diameter and core diameter is specified. As with large core single mode fibers in which the effective core numerical aperture (NA) approaches zero, which in turn results in progressively weak guidance, micro-bending or other random environmental stress effects may increase the background loss seen by the fundamental mode (FM). Accordingly, a cladding size is chosen to match the target core diameter so that the cladding isolates the core from exterior stress.

In some preferred implementations the total outer cladding diameter, as measured through the center of the core, is to be large enough to isolate the core from external stress. By way of example, the core diameter may be in the range from about, 20-150 μm, 35-150 μm, or 50-150 μm. In various embodiments the outer cladding is to be at least three times the core size. In at least one embodiment the core to cladding ratio may be 50/250 or 50/480. Notably, as the core diameter is decreased a preferred cladding diameter may be relatively increased. For example, with a 20 μm core a preferred outer cladding diameter may be at least about 500 μm and up to about 1 mm. In certain implementations of fiber amplifiers a pump guide may be implemented and considered separately from the total cladding diameter. By way of example, a 150 μm diameter pump guide may surround a 50 μm diameter core. The fiber may have a 500 μm diameter outer cladding. The fiber may be doped with a dopant to provide gain so that it can serve as an active fiber, e.g., in a laser or amplifier.

For a polarizing LCF with a nominal 50 μm core, the LCF core refractive index, relative to $n_1$, can be in the range $(n_1+1\times10^{-4})$ to $(n_1-2\times10^{-4})$ in some implementations. In a preferred embodiment $\alpha_{core} \approx \alpha_{clad}$, where α is the thermal expansion coefficient (TEC) of the respective core or cladding region. The low index glass regions arranged around the core have refractive indices smaller than $n_1$. In a preferred implementation the TEC of the low-index regions is within about +/−20% of $\alpha_{clad}$. In some embodiments the TEC of the low-index regions may exceed $7\times10^{-7}$ and may be as large as about $3\times10^{-6}$. In some embodiments the magnitude of index differences, |dn|, between each of the low index glass regions and $n_1$ may be approximately $|dn|>5\times10^{-4}$. The index difference may be larger, e.g., $|dn|>1.2\times10^{-3}$. To obtain a polarizing property in some fibers, at least two of the low index features can be arranged as SAPs and composed of a glass with TEC $\alpha_{SAP}$, where $|\alpha_{SAP}-\alpha_{core}|>1\times10^{-7}$. In some implementations, two SAP regions can be placed adjacent to and symmetrically about the core. For increased polarizing capability the SAPs can be included in an inner ring, whereas the LCF may have 1-4 rings of low-index features. In some embodiments, up to about 8 rings may be utilized, or up to about 10 rings in other embodiments. Any of the fiber embodiments disclosed herein can include portions that are active and comprise one or more regions doped with a gain medium to provide optical gain.

Without subscribing to any particular theory, increased polarizing capability with SAPs adjacent to the core may arise from the stress optic effect, at least as a primary mechanism. As a convenient measure a ratio $R_{sc}=d_{SAP}/D_{sc}$ may be considered, where $D_{sc}$ is the SAP center to core center distance, and $d_{SAP}$ is the SAP dimension which, in this example, was taken as the average SAP diameter. Applicants observed with PZ passive fibers that $R_{sc}$ was about 0.82-0.95, whereas $R_{sc}$~0.5 was obtained for PM fibers. PM fibers may have $R_{sc}$ in the range from about 0.4 to 0.7. PZ active or passive fibers may have $R_{sc}$ in the range from about 0.7-0.95, and may exceed 1, or up to about 1.5 in some embodiments. Thus, for certain embodiments of the fibers disclosed herein, PZ fibers tend to have $R_{sc}$ larger than PM fibers. PM behavior can be obtained for fiber embodiments having Rsc in the range from 0.4 to 0.7. PZ behavior can be obtained for fiber embodiments having $R_{sc}$ greater than about 0.7 and up to about 1.5. Passive PZ fibers may be fabricated with $R_{sc}$ over a somewhat wider range than active PZ fibers.

Various embodiments of glass polarizing LCF (PZ-LCF) fiber can provide one or more favorable characteristics. For example, cladding features may be large and arranged with large pitch, with fewer preform stack elements than required for fabrication of a conventional PCF. As such, fabrication is facilitated. Also, for polarizing applications, fewer stress applying part materials are required. As an example, a 40/200 PCF may utilize more than 20 SAP material regions. In contrast, some of the PZ-LCF embodiments disclosed herein include as few as two SAP regions. Moreover, bending constraints and bend performance are parameters to consider. Applicants also have discovered that for a variety of fabricated fibers, no preferred bend orientation was found to achieve best performance in passive fibers, nor is any advantage expected in polarizing applications for non-circular fiber shapes.

Numerous possibilities exist for materials and arrangements of core and cladding material and compositions including, but not limited to the following.

A cladding material may include fused silica. A cladding material may include one or a combination of pyrex, soda-lime glass, phosphate glass, chalcogenide glass, fluoride glass, or a polymer, preferably with high index uniformity. A cladding material may include a single crystal material.

The refractive index n1 of a cladding material may in the range from greater than 1 to about 3.5 at a wavelength of operation, for example from the near infrared (IR) to mid-IR.

Some embodiments of the LCF fiber can include a second cladding substantially surrounding the first cladding. A second cladding material may include fluorine-doped silica glass or boron-doped silica glass. A second cladding material index of refraction, n2, may be less than n1, on the average. For example, $\Delta n=n1-n2$ may be at least about $1.2\times10^{-3}$. The second cladding material refractive index n2 may be in the range from greater than 1.0 to less than about n1, for example up to about $n1-5\times10^{-5}$.

Multicore PM and/or PZ LCF fibers as described above, including arrangements with multiple rings of cladding features, may be utilized in active or passive multicore fibers. Multicore PM or PZ fibers may be utilized in high peak power applications in which an input pulse is divided into a plurality of spatially separated beams which are individually amplified. The beams are recombined following amplification. Such configurations provide for increased peak power useful for medical and industrial applications, and may be utilized with conventional fiber laser/amplifier technology, specialty fibers (e.g.: LCF, PCF), optical parametric oscillator/amplifiers, or combinations thereof.

FIG. 6A is a cross sectional view schematically illustrating an example of a multicore fiber comprising individual fiber cores based on step index fiber.

FIG. 6B is a cross sectional view schematically illustrating an example of a multicore fiber comprising individual fiber cores based on leakage channel fiber.

FIG. 6C is a cross sectional view schematically illustrating an example of a multicore fiber comprising individual fiber cores based on polarization maintaining leakage channel fiber.

FIG. 6E is a cross sectional view schematically illustrating an example of a polarizing leakage channel fiber with 2 layers (PZ-LCF), with its preform illustrated in FIG. 6D.

U.S. Pat. No. 8,199,398, ('398), entitled "High power parallel fiber arrays", is hereby incorporated by reference in its entirety for all that it discloses. The '398 patent provides, among other things, examples of active multicore fibers having individual fiber cores based on leakage channel fiber. FIGS. 6A-6C (which correspond to FIGS. 3A-3C of '398) illustrate multicore fibers comprising individual fiber cores 601. Each multi-core fiber includes 19 individual single-mode cores in these examples. FIGS. 6B and 6C illustrate active multicore Leakage Channel fibers (MC-LCF) .The shaded circles 601 represent the core areas, at least some of which, in this example, are (optionally) doped with a dopant such as a rare earth ion (e.g., Yb) whereas the small non-shaded circles 602 represent air-holes or glass areas with reduced refractive index compared to the cores 601 and/or material surrounding the low-index areas 602. As will be discussed below, at least some features surrounding the cores 601 may be SAPs 604. In the example fibers shown in FIGS. 6A-6C, six features 602, 604, surround each of the cores 601. In other embodiments, a different number of cores 601 and/or a different number of features 602, 604 can be used. In other embodiments, passive fibers do not include doped regions.

As discussed in '398, for fiber array applications multi-core leakage channel fibers may allow tighter packing of the cores compared to conventional step-index multicore single-mode fibers with less mode-coupling because of the reduction or minimization of the modal wings of each individual mode. This is further illustrated in FIG. 4 of '398, where the modal intensity distribution of a conventional single-mode fiber is compared to the intensity distribution of a leakage channel fiber. In this figure, the wings of the intensity distribution of the leakage channel fiber go down to zero much faster than in conventional step-index fibers.

In addition to mode coupling, any substantial thermally induced phase fluctuations are to be considered in multicore fibers, particularly for applications utilizing ultrashort pulses. Such thermal fluctuations may be compensated by the introduction of appropriate phase delays introduced before or after the fiber. Such phase delays can for example be implemented with optical phase plates of a certain thickness. For small heat loads an adaptive optics compensation scheme can adjust for the path length difference. In at least one embodiment the amplifiers of the array may be spaced such that thermal fluctuations of the amplifiers are matched sufficiently to limit relative phase fluctuations at amplifier outputs to a bandwidth, for example less than 10 kHz, and such that optical energy coupling between any of the amplifiers is small or negligible. Examples of such implementations are discussed in '398.

Multicore gain fibers can also be manufactured in an all polarization maintaining (PM) configuration. FIG. 6C illustrates an example of a PM design. The fiber is similar to the structure of the fiber shown in FIG. 6B, but for the additional incorporation of stress producing regions. In the fiber of FIG. 6C, SAPs 604 are disposed on opposite sides of the cores. In this example the stress producing regions correspond to two of six features immediately surrounding each core. The regions produce stress in the fiber core and lead to polarization maintaining operation.

In the examples shown in FIGS. 6B-6C there is one low index feature disposed between two adjacent core regions. In order to further reduce mode-coupling, the core separation can be increased and/or more than one low index feature can be disposed between two core regions as will be discussed below. In various embodiments, none, some, or all of the cores 601 can be doped with a dopant to provide optical gain.

Multicore fibers, for use in either active of passive applications, may also be manufactured in a polarizing configuration. As discussed above, and without subscribing to any particular theory, it is believed that the stress optic effect has considerable influence on polarizing capability. Arrangements in which SAPs are configured with increased distance from the core can result in PM operation rather than polarizing operation. Conversely, if the distance of the SAPs to a core is decreased, polarizing (PZ) operation can be obtained. Further, with increased core to core separation mode-coupling between adjacent cores can be reduced. For example, as discussed above, for certain embodiments of the fibers disclosed herein, PZ fibers tend to have $R_{sc}$ larger than PM fibers. PM behavior can be obtained for fiber embodiments having $R_{sc}$ in the range from 0.4 to 0.7. PZ behavior can be obtained for fiber embodiments having $R_{sc}$ greater than about 0.7 and up to about 1.5. Passive PZ fibers may be fabricated with $R_{sc}$ over a somewhat wider range than active PZ fibers.

FIG. 6E illustrates an example of a multicore fiber 610 (its preform 609 is shown in FIG. 6D) with seven (7) core regions 611 each surrounded by two (2) rings of low index cladding features. In this example, the two rings surrounding at least some of the core regions 611 contains two SAPs 614 arranged such that the SAPs are adjacent to or in close proximity to the cores for PZ capability. In various embodiments, none, some, or all of the core regions 611 can be doped. The fiber 610 may be modified with doped core regions having a dimension, for example maximum diameter, in the range of about 35-100 µm in order to construct a large core leakage channel, polarizing fiber. In some embodiments a core size greater than about 20 µm may be utilized, e.g., from about 20-100 µm Further examples of multicore fibers and applications thereof are discussed in '398. For example, double-clad, multicore rare-earth doped (e.g., Yb) amplifiers may be used to generate high peak power. In another example, coaxial multicore fiber arrangements may include a single circular array of cores near the periphery of the fiber at least partially surrounded by low index cladding features (not shown).

EXAMPLE

Polarizing LCF Fiber and Performance

FIGS. 7A-7B illustrates an example of a preform 701 (FIG. 7A) for a polarizing LCF and a corresponding example of a portion of a fabricated LCF 703 (FIG. 7B). FIG. 7B is a microscope image of 50/450 polarizing LCF 703 cleaved end facet. Dark regions 705 are fluorine or boron doped low index glass. The LCF fiber 703 shown in FIG. 7B was fabricated via the stack and draw method. A stack of cladding rods 701a, rods with low index cores 701b, and SAP rods 701c was arranged around a core rod 701d and stacked inside an outer tube 701e in the geometry shown in the preform 701 of FIG. 7A.

In this example preform 701, there are five layers in the stack, where the center rod is counted as layer one. Layers two and three of the preform stack include low index features 701b. Layer two has six elements four of which are low index features 701b with d/Λ=0.8 with the remaining two features 701c being stress applying parts SAPs with $d/\Lambda_p$=0.9. Layer three has 12 low index features with d/Λ=0.7. Layer four has 18 rods 701a of background cladding glass. Layer five has 24 rods 701a of background cladding glass. A tight fitting cladding tube 701e with a ratio of inner diameter (ID) to outer diameter (OD) of ID/OD=0.75 was fabricated. The corner rods in layer five shown intersecting with the inner wall of the cladding tube were removed from the stack in stages while the ends of the remaining rods were fused together to create a bundle. The bundle was inserted in the cladding tube. The assembled fiber preform was brought to the draw tower. The preform 701 was drawn under vacuum to a cladding diameter of 450+/−5 um. A protective high index polymer coating was applied and the fabricated fiber 703 was wound on a reel to form a coil.

Bend loss, $M^2$, and polarization extinction ratio (PER) as a function of coil diameter were measured with a four meter length of fiber. In this example the input beam wavelength was 1040 nm. Additionally a cut-back measurement was performed which indicated the FM background loss in the core was ~0.3 dB/m.

FIGS. 8A-8D are plots illustrating performance of the polarizing LCF of FIG. 7B. This example fiber was not PM but was linearly polarizing.

Figure 8A:
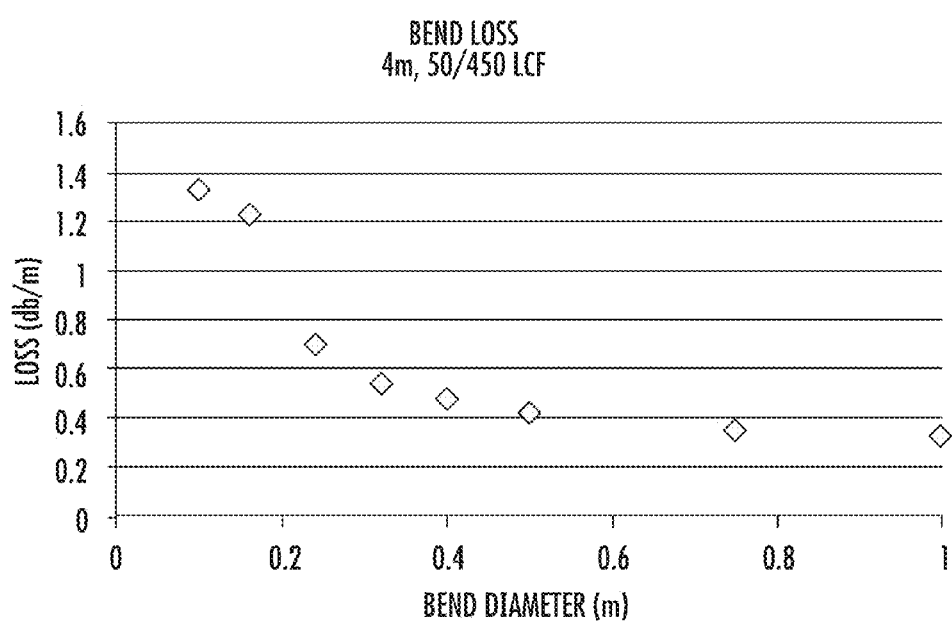
FIGS. 8A, 8B, 8C, and 8D are plots illustrating performance of the polarizing LCF of FIG. 7B.

FIG. 8A illustrates bend loss for a four meter length of 50/450 polarizing LCF. Bend loss is similar for non-PM LCF versions with similar structure parameters. Bend loss is large compared to a step index fiber.

Figure 8B:
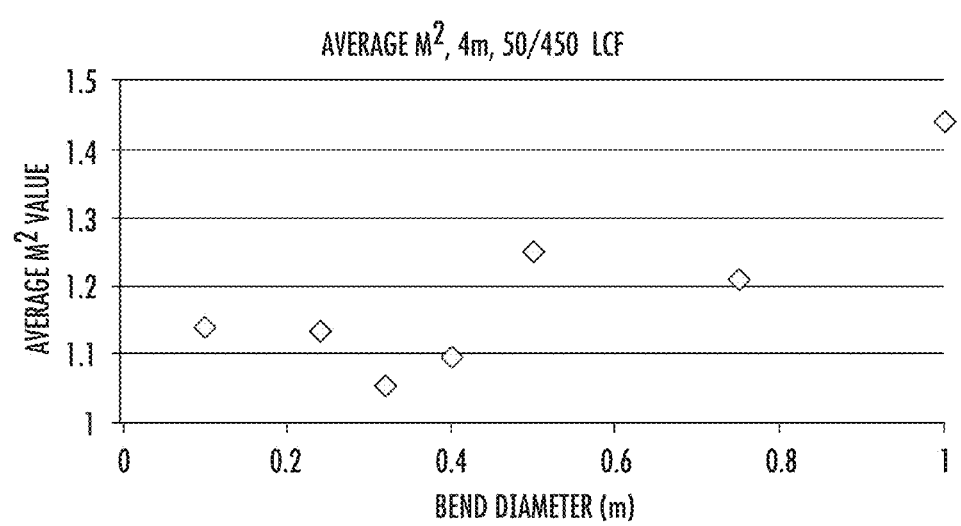

FIG. 8B illustrates M2 measurements for a length of polarizing 50/450 LCF. For coil diameters less than 400 mm the fiber M2 was less than about 1.2, and in the range from about 1.05 to about 1.2.

Figure 8C:
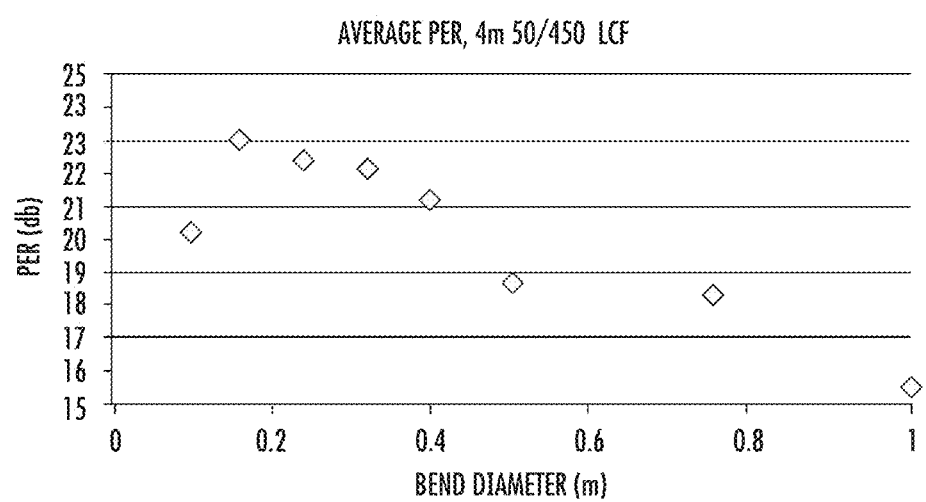

FIG. 8C illustrates polarization extinction ratio (PER) measurements from the output of a four meter length of 50/450 polarizing LCF. For coil diameters less than 400 mm the fiber exhibited PER exceeding about 20 dB which indicates strong guidance of one polarization state of the FM.

Figure 8D:
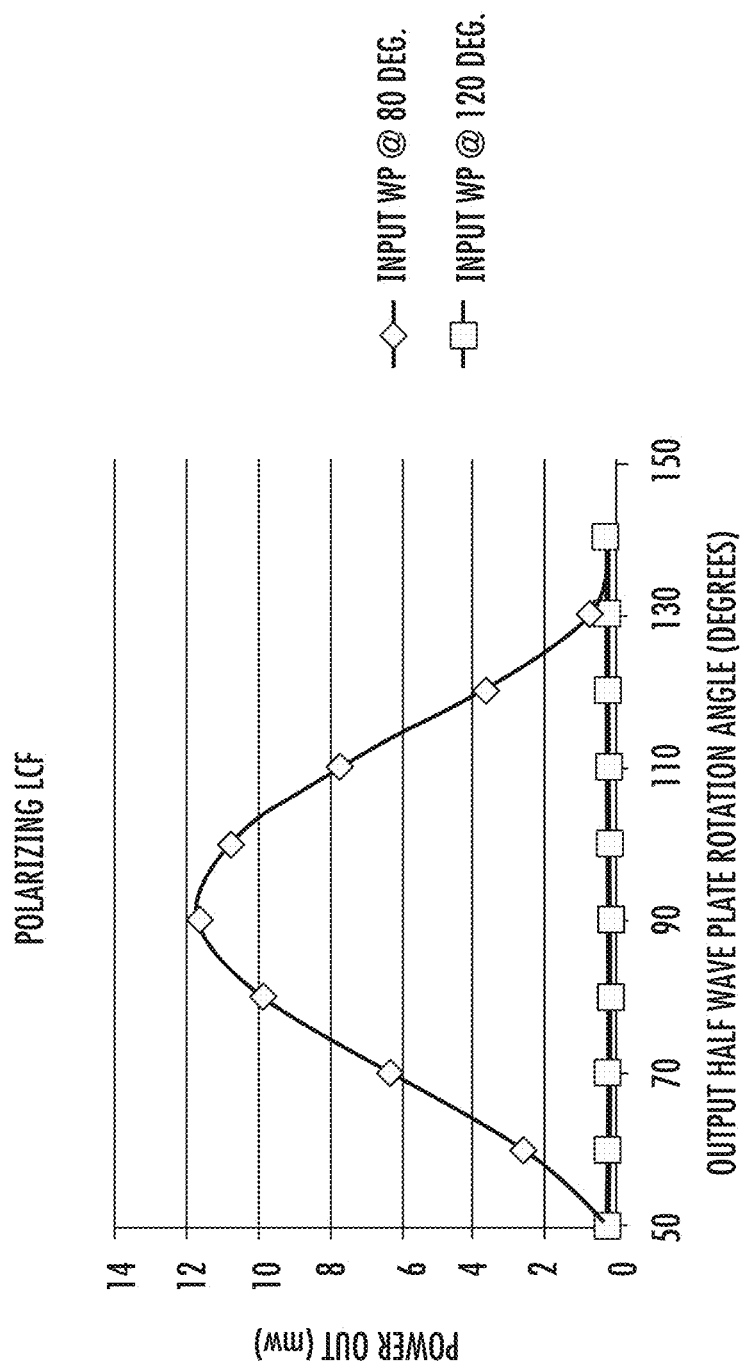

FIG. 8D illustrates the polarizing characteristic of the LCF. In this example four meters of fiber were utilized, with a coil diameter of 160 mm. An input half-waveplate (WP) was rotated to match the polarizing axis of the fiber. An output half-waveplate was scanned to measure the output variation. The input waveplate was rotated by 45 degrees and the output waveplate was scanned to yield measurements close to zero output for all waveplate angles. This quantitatively illustrates the polarizing property of this example LCF.

Figure 9A:
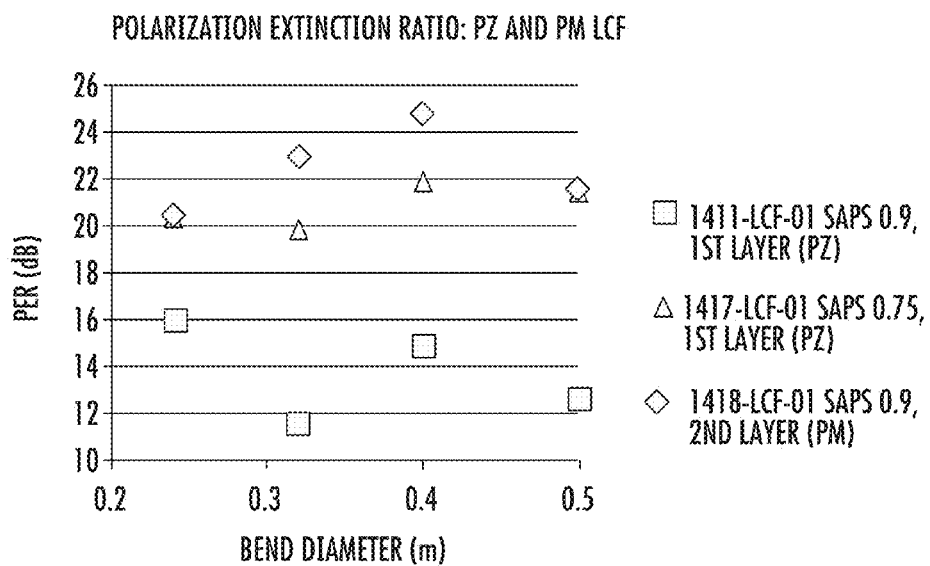
FIGS. 9A, 9B, and 9C are plots illustrating performance of various example fabricated LCFs with various arrangements of stress applying parts (SAPs) therein. Performance of an example non-PM fiber was also measured for comparison.
Figure 9B:
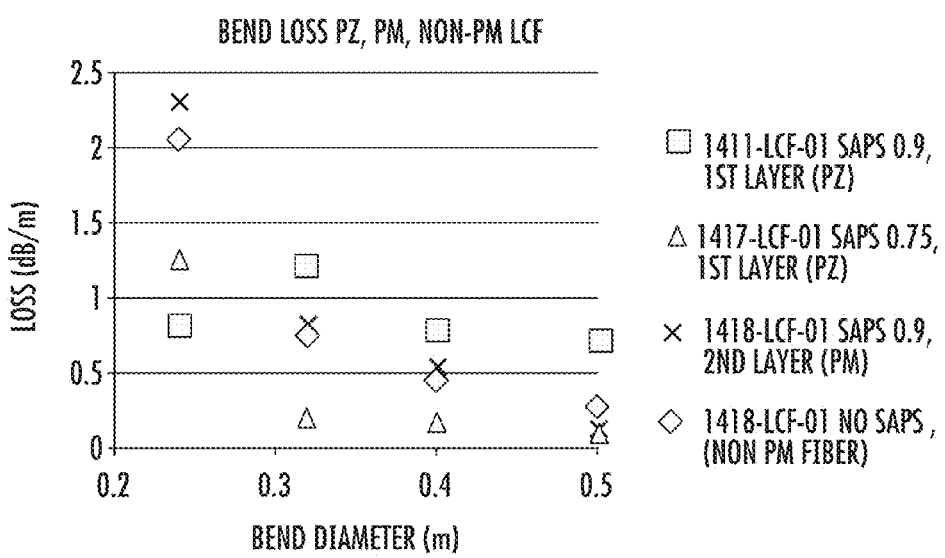
Figure 9C:
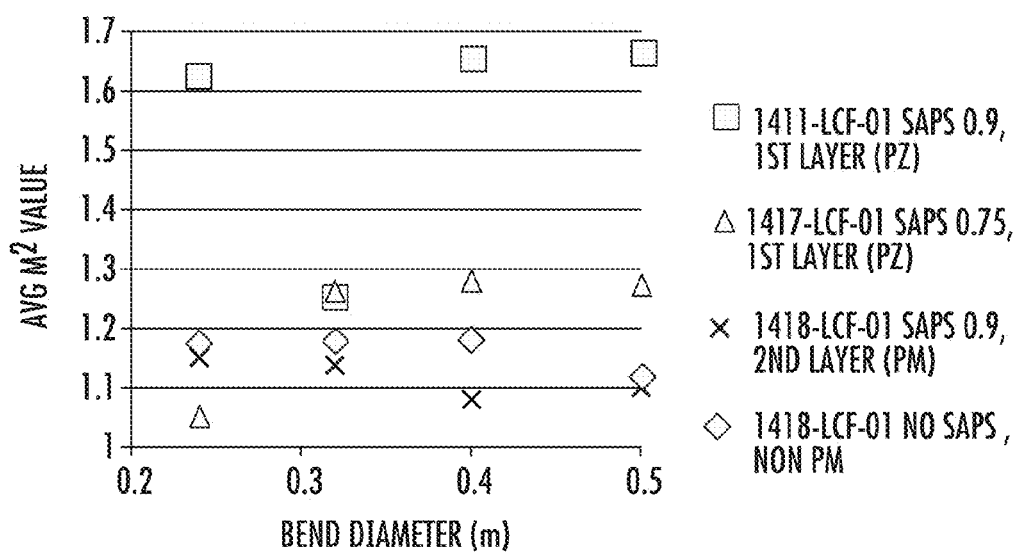

FIGS. 9A-9C are plots illustrating performance of additional examples of fabricated LCFs having two layers and various arrangements of stress applying parts (SAPs) therein. The PM fiber in the following examples corresponds to the fabricated fiber 215 of FIG. 2B, with relatively large SAPs, $d/\Lambda_p \sim 0.9$. The two PZ fibers correspond to the fabricated fibers 305, 315 of FIGS. 3A and 3B, with SAPs having $d/\Lambda_p \sim 0.9$ and 0.75, respectively.

FIG. 9A illustrates the PERs of the three fibers as a function of bend diameter. With bend diameters less than about 0.4 m the PM fiber exhibited the highest PER. Notably, the larger SAPs, corresponding to $d/\Lambda_p \sim 0.9$, resulted in the largest extinction with the PM fibers and SAPs in the outer layer. The lowest extinction was found with the PZ fiber with SAPs in the innermost layer, adjacent to the core. For the PZ implementations, reducing the SAP dimension improved the relative PER.

Without subscribing to any particular theory, it is believed that the stress optic effect resulted in increased mode coupling between the fundamental mode and a few higher order modes as the SAP dimension was increased. Moreover, in the experiments launch conditions were not optimized.

FIG. 9B illustrates bend loss performance as a function of coil diameter. In these experiments the loss in total power was determined, without consideration of the modes. A non-PM fiber measurement was also included. The non-PM configuration exhibited the highest loss at smaller bend diameters. Also, among the PZ and PM fibers, the higher PER resulted in increased loss with smaller bend diameters.

FIG. 9C illustrates $M^2$ measurements for the PZ fibers, PM fiber, and a non-PM fiber. The $M^2$ value was in the range of about 1.05-1.3 for the PZ fiber with reduced SAP dimension ($d/\Lambda_p \sim 0.75$), whereas $M^2 < 1.7$ was obtained for the larger SAPs. The larger value may be associated with increased higher order mode content induced narrowing of some of the leakage channels by the large size of the SAPs adjacent to the core. As above, each PZ SAP was in the inner ring proximate to the core. The measurements of FIG. 9C were obtained at a wavelength of 1040 nm. It was observed that the $M^2$ measurement improved somewhat at a longer wavelength of 1.55 μm.

It is expected, for example, that $d/\Lambda_p$ in a preferred range from about 0.4-0.75 may provide for desirable $M^2$ less than about 1.3, with bend diameters in the range from about 0.2-0.6 m. In some embodiments $M^2$ may be in the range from about 1.05-1.7 with bend diameters in the range from about 0.2-0.6 m.

In some embodiments SAPs in the innermost layer, adjacent to the core, may be adjusted to effectively reduce $d/\Lambda$ of the SAPs while maintaining the larger SAP size. For example, fewer cladding features may be utilized and/or the spacing between cladding features may be increased. With such implementations the overall shape of the mode field may become slightly elliptical.

Figure 10A:
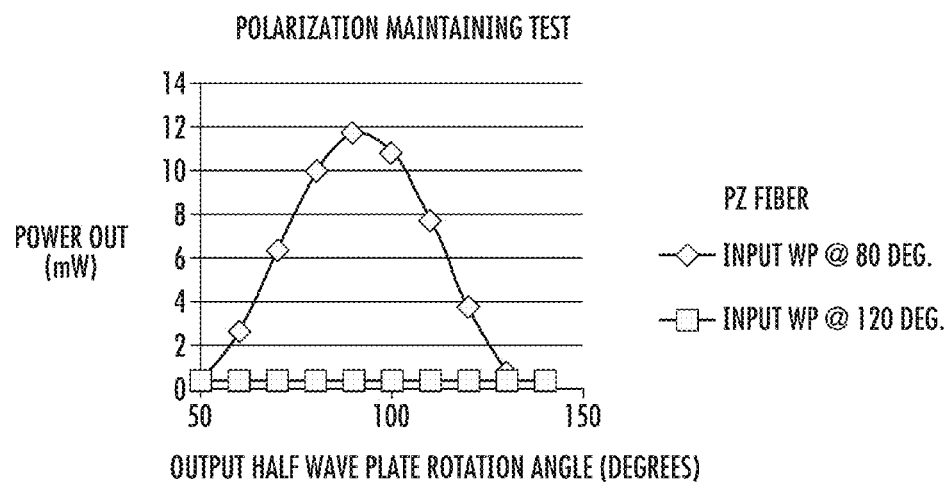
FIGS. 10A and 10B are plots comparing polarization maintaining capability of examples of PZ and PM fibers.
Figure 10B:
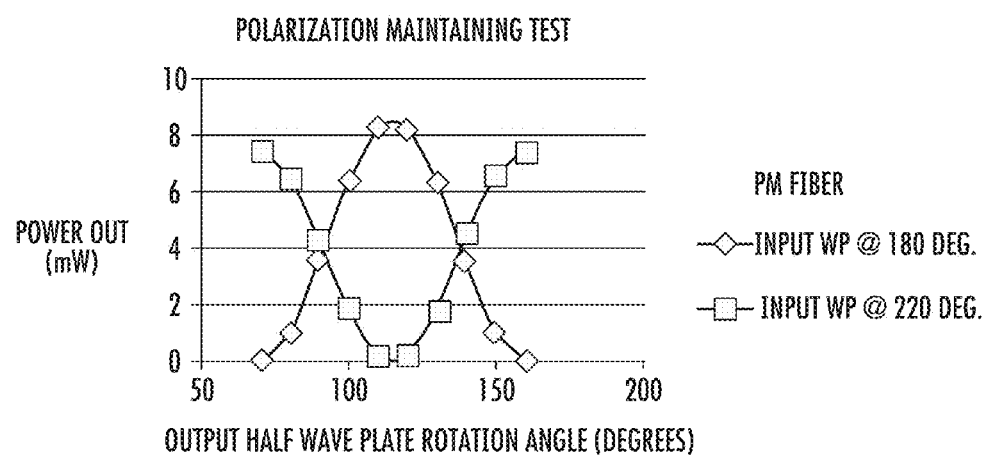

FIGS. 10A-10B are plots comparing polarization maintaining capability of examples of PZ and PM fibers, respectively.

EXAMPLE

LCF Pulse Compressor

PZ or PM fiber arrangements may be utilized as passive (transmission) fibers or as fiber compressors in ultrashort pulse laser systems. In such systems a temporally broadened pulse or other pulse in the picosecond to nanosecond range can be compressed to a shorter pulse width. In some implementations the well-known chirped pulse amplification technique may be utilized.

By way of example, a 1.4 m length of fiber was employed at a signal wavelength near 1.5 um to compress input pulses of duration 2.46 ps to shorter pulses 57 fs long. Input PER was 32 dB. Output PER was 21 dB.

In some implementations, compressed pulse widths as short as about 50 fs, 100 fs, or 1 ps may be provided. In some embodiments, pulse widths below 100 fs may be generated.

EXAMPLE

PER Measurement of a SM PM Fiber

In one example, input light with PER of 26 dB was launched into 900 m of SM PM fiber. The PER at the output was 21 dB. A change in PER of 5 dB, probably due to coupling between the allowed states, was observed along the 900 m length of the fiber.

EXAMPLE

Yb-doped Core, Polarizing, LCF Fiber Amplifier

Figure 11:
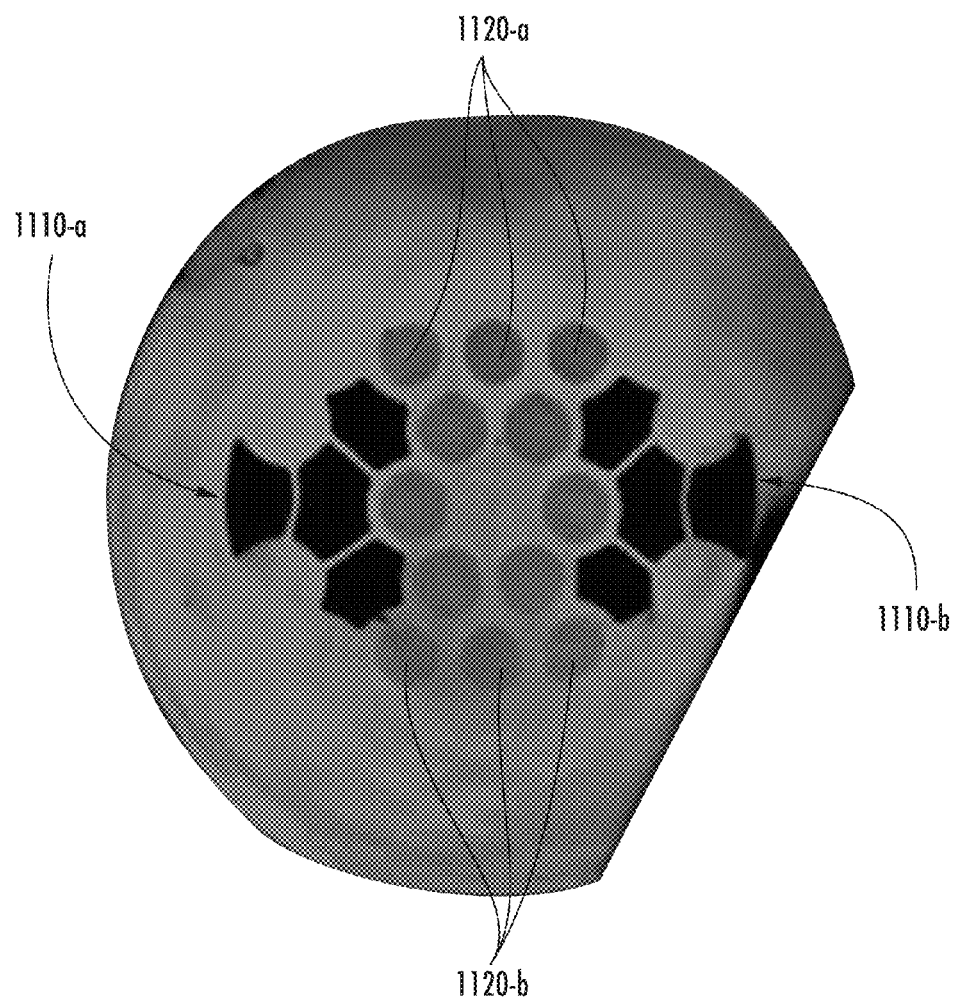
FIG. 11 illustrates an example of a portion of a fabricated, Yb-doped, polarizing leakage channel amplifier fiber.

In one example a polarizing leakage channel fiber with an index matched Yb-doped core was fabricated. An image of a portion of the fiber cross section is shown in FIG. 11. The fiber was fabricated with a total of eight SAP elements. The SAP elements were arranged in two groups of four (1110-a, 1110-b). In a group of four, three SAPs are in layer #3 and one SAP is in layer #4 where layer #1 is the fiber core. Layer #2 contains no SAPs, only low index features with $d/\Lambda=0.8$. In addition to the SAPs, layer #3 contains six low index features with $d/\Lambda=0.7$ (1120-a, 1120-b). Layer #4 is mostly silica glass except for the two SAPs. All SAPs have $d_{SAP}/\Lambda_p=0.9$. The average waveguide core diameter is 50 um while the average cladding diameter is 400 um. The cladding was made slightly hexagonal to facilitate pump absorption. The fiber was drawn with a low index polymer coating. In one configuration a four meter length of the fiber was coiled to a diameter of 0.5 m. The orientation of the fiber was controlled such that the axis defined by the SAP groups was perpendicular to the plane of the coil. Fiber ends were angle polished to about 5° and ferruled.

Pulses from a fiber laser were injected into one end of the LCF from a SM fiber using free space coupling. Average input power was about 24 mW with about 26 dB PER at a center wavelength near 1040 nm. Input pulse repetition rate was about 50 MHz. Pump light at 980 nm from a high power laser diode was free space coupled into the other end of the fiber. For about 20 W input pump power, about 6.8 W of amplified signal was obtained. Output PER was about 18.8 dB with $M^2<1.2$. Signal light injected into one polarization axis of the fiber was amplified. Signal light injected into the other (orthogonal) polarization axis was not amplified or significantly guided. However, in this example, a low-level background was observed in the orthogonal polarization axis which may have resulted from amplified spontaneous emission (ASE) originating from the unidirectional pumping arrangement. This example demonstrates capability of selectively amplifying polarized input pulses in such a way as to output pulses having substantially a single polarization and a high extinction ratio. For example, with polarized input pulses and amplifier gain exceeding 20 dB, PER at the amplifier output in the range of about 15 dB to about 25 dB may be obtained. The polarized output pulses exhibited good beam quality, as exemplified with $M^2$ in the range from about 1.05 to less than about 1.2, and below about 1.8.

EXAMPLE

Birefringence Model Results for PM and PZ LCF

In one example a commercial finite element analysis program was utilized (RSoft FemSIM available from Synopsys, Inc.) to calculate mode profiles and effective mode indices, $n_{eff}$, for non-PM and PM LCF. The software allowed the user to simulate the effects of thermally induced stress on $n_{eff}$ of the fundamental mode transverse electric (TE) and transverse magnetic (TM) polarization states. The modal birefringence, B, is calculated by $B = n_{eff\_TE} - n_{eff\_TM}$. B may be used as a good proxy for predicting PM/PZ fiber PER. Without considering other perturbations on the system, or details of a fiber's index profile, values of $B>0$ lead to PM behavior while larger values of B lead to polarizing behavior.

In setting up the model system, and to obtain useful approximations, several assumptions were made about unknown material properties. Young's modulus, $Y_{SiO2}$, the Poisson ratio, $v_{SiO2}$, thermal expansion coefficient ($\alpha_{SiO2}$), and stress-optic coefficients for fused silica are well known. Similar values for the fluorine doped silica in the low index features ($Y_{LI}$, $v_{LI}$, $\alpha_{LI}$) and for the boron-doped silica in the SAPs ($Y_{SAP}$, $v_{SAP}$, $\alpha_{SAP}$) are not well known. A reasonable assumption is that $Y_{SiO2} \approx Y_{LI} \approx Y_{SAP}$ and similarly $v_{SiO2} \approx v_{LI} \approx v_{SAP}$. In this example it was assumed $\alpha_{SiO2} = 5.4 \times 10^{-7}$, $\alpha_{LI} = 6 \times 10^{-7}$. To get a value for $\alpha_{SAP}$ B was first measured for a standard single mode PM fiber (Nufern PM 980, available from Nufern, East Granby, Conn.) which gave $B \approx 3.8-3.9 \times 10^{-4}$. Using geometry and index profiles from the PM 980 a model was created, and the value $\alpha_{SAP}$ was adjusted until the model B agreed with the measured B. A value for $\alpha_{SAP}$ of about $1.3 \times 10^{-6}$ is reasonable for the likely composition of the SAP (boron-doped silica).

Below is a table of example birefringence B values calculated with models employing fiber geometries in the preceding figures.

TABLE 1

Calculated modal birefringence values for various LCF fiber geometries

| FIG. ID | Model Birefringence B ($\times 10^{-5}$) For FM | Comments |
| --- | --- | --- |
| FIG. 2A | 0 | Non-PM fiber. B = 0 |
| FIG. 2B | 2.7 | PM fiber |
| FIG. 3A | 13.6 | PZ fiber |

TABLE 1-continued

Calculated modal birefringence values for various LCF fiber geometries

| FIG. ID | Model Birefringence B ($\times 10^{-5}$) For FM | Comments |
| --- | --- | --- |
| FIG. 3B | 8.7 | PZ fiber |
| FIG. 11 | 9.3 | PZ fiber |
| N/A | 6.8 | PM fiber like FIG. 11 but missing N = 4 layer SAPs |

Notably, that compared to standard step index PM fibers, B values for these examples of PM/PZ LCF are low. The model indicates there is a transition range for PM→PZ where if B is less than about $7 \times 10^{-5}$ the fiber is PM. If B greater than about $8 \times 10^{-5}$ the LCF is PZ.

As an example of the benefit of the model, the modal birefringence of the Yb-doped core, polarizing, LCF fiber amplifier of the above example was estimated, which led to an prediction of PZ behavior for the active fiber.

EXAMPLE

Index Uniformity of Cladding Material

In the fabrication of large core fibers index uniformity is to be considered. For example, U.S. Pat. No. 7,450,813, entitled "Rare earth doped and large effective are optical fibers for fiber lasers and amplifiers" discloses effects of index non-uniformity. U.S. Pat. No. 7,450,813 ('813) is hereby incorporated by reference in its entirety for all it discloses. For example, '813 discusses effects of index non-uniformity, including formation of localized waveguides, and identifies methods for obtaining index uniformity. See '813, at least at columns 5:28-6:34. In certain preferred embodiments of a polarizing (PZ) or polarization maintaining (PM) leakage channel fiber, the uniformity of the cladding material surrounding the core can be better than about $5 \times 10^{-5}$, about $1 \times 10^{-5}$, or better than about $5 \times 10^{-6}$.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" as used in this application and the appended claims are to be construed to mean "one or more" or "at least one" unless specified otherwise. As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

The example experiments, experimental data, tables, graphs, plots, photographs, figures, and processing and/or operating parameters (e.g., values and/or ranges) described herein are intended to be illustrative of configuration or operating conditions of the disclosed fibers and are not intended to limit the scope of the configuration or operating conditions for various embodiments of the fibers disclosed herein. Additionally, the experiments, experimental data, calculated data, tables, graphs, plots, photographs, figures, and other data disclosed herein demonstrate various regimes in which embodiments of the disclosed fibers may operate effectively to produce one or more desired results. Such operating regimes and desired results are not limited solely to specific values of operating parameters, conditions, or results shown, for example, in a table, graph, plot, figure, or photograph, but also include suitable ranges including or spanning these specific values. Accordingly, the values disclosed herein include all of the values in the range between any of the values (or upper or lower limits) listed or shown in the tables, graphs, plots, figures, photographs, etc. Additionally, the values disclosed herein include the range of values above or below any of the values listed or shown in the tables, graphs, plots, figures, photographs, etc. as might be demonstrated by other values listed or shown in the tables, graphs, plots, figures, photographs, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed fibers may be configured differently or operate in other operating regimes and/or produce other results than shown and described with reference to the example experiments, experimental data, tables, graphs, plots, photographs, figures, and other data herein.

For purposes of summarizing the present disclosure, certain aspects, advantages and novel features are described herein. It is to be understood, however, that not necessarily all such advantages may be achieved in accordance with any particular embodiment. Thus, certain implementations may be embodied or carried out in a manner that achieves one or more advantages without necessarily achieving other advantages as may be taught or suggested herein. No feature or group of features is essential or necessary for each embodiment. Features can be added, removed, or arranged differently than shown or described.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A polarizing (PZ) optical leakage channel fiber (LCF), comprising:
    a first cladding region comprising a first cladding material having a first index of refraction, n1;
    cladding features disposed in said first cladding region, said cladding features comprising a second cladding material having a second index of refraction, n2, wherein n2 is less than n1;
    stress applying parts (SAPs) disposed in said first cladding region, said SAPs comprising a material with a thermal expansion coefficient, $\alpha_{SAP}$; and
    a core region at least partially surrounded by said cladding features and said SAPs, said core region comprising a glass with a thermal expansion coefficient, $\alpha_{core}$;
    wherein arrangement of said SAPs satisfies the relations: $R_{sc}=d_{SAP}/D_{sc}$, where $D_{sc}$ is the distance of the SAP center to the center of the core center region, and $d_{SAP}$ is the average SAP diameter, and $d\alpha=|\alpha_{SAP}-\alpha_{core}|$, wherein $R_{sc}$ and $d\alpha$ are sufficiently large to induce stress birefringence into said core region, and
    wherein said PZ fiber exhibits increased birefringence (B) which exceeds that associated with a transition range from polarization maintaining (PM) to PZ operation such that a polarized output is produced from said PZ leakage channel fiber.

2. The PZ fiber according to claim 1, wherein $R_{sc}$ is in the range from about 0.7 to about 0.95.

3. The PZ fiber according to claim 1, wherein $d\alpha$ is greater than about $1\times10^{-7}$.

4. The PZ fiber according to claim 1, wherein a refractive index of said core, is in the range from about $(n_1+1\times10^{-4})$ to $(n_1-2\times10^{-4})$.

5. The PZ fiber according to claim 1, wherein said core region propagates at least one lower order mode having a first polarization, while limiting propagation of a second polarization of said at least one lower order mode.

6. The PZ fiber according to claim 1, said second cladding material comprising a second glass that comprises fluorine-doped silica glass or boron-doped silica glass.

7. The PZ fiber according to claim 1, wherein at least a portion of said core region is doped with a dopant providing optical gain, and said PZ fiber comprises:
    cladding features disposed in an inner ring;
    multiple groups of SAPs partially surrounding said inner ring; and
    additional cladding features substantially disposed in a second ring partially surrounding said inner ring,
    wherein said second ring substantially includes SAPs from each of said groups, said PZ capable of producing an optical output pulse exhibiting PER in the range from about 15 dB to 25 dB and $M^2$ in the range from about 1.05 to about 1.08, in response to an optical input pulse.

8. The PZ fiber according to claim 1, wherein $\Delta n=n1-n2$ is at least about $1.2\times10^{-3}$.

9. The PZ fiber according to claim 1, wherein n2 is in the range from greater than 1 to about $(n1-5\times10^{-5})$.

10. The PZ fiber according to claim 1, wherein n1 is in the range from greater than 1 to about 3.5.

11. The PZ fiber according to claim 1, wherein said at least a portion of the fiber is doped with rare-earth ions.

12. The PZ fiber according to claim 1, wherein at least a portion of said core region is doped with a dopant providing optical gain.

13. The PZ fiber according to claim 1, wherein said cladding features are arranged in a plurality of rings, and said SAPs are arranged in a first innermost ring adjacent to said core region.

14. The PZ fiber according to claim 1, wherein said SAPs and cladding features are arranged in at least one ring, each of said SAPs having a spacing $\Lambda_p$ between said SAP and a nearest cladding feature, wherein $d_{SAP}/\Lambda_p$ of at least one SAP is in the range from about 0.4 to about 0.75.

15. The PZ fiber according to claim 1, wherein said polarized output from said fiber has an $M^2$ in the range from about 1.05 to about 1.7.

16. The PZ fiber according to claim 1, wherein the first cladding material comprises a first glass that comprises fused silica.

17. The PZ fiber according to claim 1, wherein said first cladding material comprises one or a combination of pyrex, soda-lime glass, phosphate glass, chalcogenide glass, fluoride glass, or a polymer.

18. The PZ fiber according to claim 1, wherein said first cladding material comprises a single crystal material.

19. The PZ fiber according to claim 1, wherein said core region has an average core diameter in the range from about 35 µm to about 150 µm and said first cladding region has an outer diameter at least about three times larger than the average core diameter.

20. The PZ fiber according to claim 1, wherein said PZ fiber comprises multiple cores, and multiple rings of low index cladding features surround at least a portion of at least one of said multiple cores.

21. The PZ fiber according to claim 20, wherein said at least one of said multiple cores is doped with rare-earth ions and arranged as a portion of an active multicore leakage channel fiber array (MC-LCF) for generating high peak power optical pulses.

22. The PZ fiber according to claim 1, wherein said PZ fiber is arranged as a pulse compressor in a high peak power amplification system, and is capable of compressing picosecond input pulses to a pulse width of less than about 100 fs.

23. The PZ fiber according to claim 1, wherein, with said $R_{sc}$ and dα, the effective mode indices of the fundamental mode are altered in such a way that an effective index of a first polarization state is raised and the effective index of a second other polarization state is lowered.

24. The PZ fiber according to claim 1, wherein $R_{sc}$ is in the range from about 0.7 to 1.5, and dα is greater than about $1\times10^{-7}$, in order to induce stress birefringence into said core region and to provide for a polarized output from said PZ-LCF.

25. The PZ fiber according to claim 1, wherein said core region has an average core diameter in the range from about 50 µm to about 150 µm.

26. The PZ fiber according to claim 25, wherein and said first cladding region has an outer diameter at least about three times larger than the average core diameter.

27. A polarization maintaining (PM) optical leakage channel fiber (LCF), comprising:
 a first cladding region comprising a first cladding material having a first index of refraction, n1;
 cladding features disposed in said first cladding region, said cladding features comprising a second cladding material having a second index of refraction, n2 wherein n2 is less than n1;
 stress applying parts (SAPs) disposed in said first cladding region, said SAPs comprising a material with a thermal expansion coefficient, $\alpha_{SAP}$;
 a core region at least partially surrounded by said cladding features and said SAPs, said core region comprising a glass with a thermal expansion coefficient, $\alpha_{core}$;
 wherein said cladding features are disposed in a plurality of rings and said SAPs are disposed beyond an inner ring and distal to said core,
 wherein arrangement of said SAPs satisfies the relations: $R_{sc}=d_{SAP}/D_{sc}$, where $D_{sc}$ is the SAP center to core center distance, and $d_{SAP}$ is the average SAP diameter, and $d\alpha=|\alpha_{SAP}-\alpha_{core}|$, wherein $R_{sc}$ and dα are sufficiently large to induce stress birefringence into said core and to maintain polarization of a polarized input beam received at an input to said PM fiber, and
 wherein a birefringence (B) of said PM LCF is less than about $7\times10^{-5}$.

28. The PM fiber according to claim 27, wherein $R_{sc}$ is in the range from about 0.4 to about 0.7.

29. The PM fiber according to claim 27, wherein said PM fiber comprises multiple core regions.

30. The PM fiber according to claim 27, wherein, with said $R_{sc}$ and dα, the effective mode indices of the fundamental mode are altered in such a way that an effective index of a first polarization state is raised and the effective index of a second polarization state is lowered.

31. The PM fiber according to claim 27, wherein dα is greater than about $1\times10^{-7}$.

* * * * *

UNITED STATES PATENT AND TRADEMARK OFFICE
CERTIFICATE OF CORRECTION

PATENT NO. : 10,036,850 B2
APPLICATION NO. : 15/146693
DATED : July 31, 2018
INVENTOR(S) : Shigeru Suzuki It is certified that error appears in the above-identified patent and that said Letters Patent is hereby corrected as shown below:

In Column 2, Line 6, change "$R_{SC} = d_{SAP}/D_{SC}$" to --$R_{SC} = d_{SAP}/D_{SC}$,--.

In Column 10, Line 14, change "core in" to --core--.

In Column 13, Line 8, change "$|dn| > 1.2 \times 10^{-3}$" to --$|dn| \geq 1.2 \times 10^{-3}$.--.

In Column 24, Line 16, Claim 27, change "n2" to --n2,--.

Signed and Sealed this
Twenty-third Day of October, 2018

Andrei Iancu
*Director of the United States Patent and Trademark Office*